United States Patent
Taruki

(10) Patent No.: US 6,769,051 B2
(45) Date of Patent: Jul. 27, 2004

(54) MEMORY CONTROLLER AND MEMORY CONTROL METHOD FOR CONTROLLING AN EXTERNAL MEMORY DEVICE TO BE ACCESSIBLE EVEN IN AN ADDRESSING MODE THAT IS NOT SUPPORTED THEREBY

(75) Inventor: Maiko Taruki, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 203 days.

(21) Appl. No.: 10/133,744

(22) Filed: Apr. 29, 2002

(65) Prior Publication Data

US 2002/0188820 A1 Dec. 12, 2002

(30) Foreign Application Priority Data

Jun. 6, 2001 (JP) ........................................ 2001-170897

(51) Int. Cl.[7] .............................................. G06F 12/00
(52) U.S. Cl. ...................... 711/154; 711/103; 711/168; 711/169
(58) Field of Search ................................ 711/154, 167, 711/168, 169, 102, 103

(56) References Cited

U.S. PATENT DOCUMENTS

| | | | | |
|---|---|---|---|---|
| 5,608,896 A | * | 3/1997 | Vogley | 713/503 |
| 5,611,071 A | * | 3/1997 | Martinez, Jr. | 711/133 |
| 5,615,358 A | * | 3/1997 | Vogley | 713/501 |
| 5,777,946 A | * | 7/1998 | Inuzuka et al. | 365/240 |
| 6,061,815 A | * | 5/2000 | Sobelman | 714/738 |
| 6,427,197 B1 | * | 7/2002 | Sato et al. | 711/169 |
| 6,574,707 B2 | * | 6/2003 | Shaw | 711/118 |
| 6,633,835 B1 | * | 10/2003 | Moran et al. | 702/190 |

FOREIGN PATENT DOCUMENTS

| | | |
|---|---|---|
| JP | 8-83237 | 3/1996 |
| JP | 10-207824 | 8/1998 |

OTHER PUBLICATIONS

"Am29BDS323D 32 Megabit (2M×16–Bit) CMOS 1.8 Volt–only Simultaneous Read/Write, Burst Mode Flash Memory" Advanced Micro Devices, Jun. 20, 2000, pp. 1–43.

* cited by examiner

Primary Examiner—Donald Sparks
Assistant Examiner—Brian R. Peugh
(74) Attorney, Agent, or Firm—McDermott Will & Emery LLP

(57) ABSTRACT

A comparison circuit compares a burst access request from a bus controller with an access mode that is supported by an external memory device and that is set in a device information setting register. When the burst access request does not match the access mode that is supported by the external memory device, a control signal generation circuit accesses the external memory device in an access mode different from that of the burst access request from the bus controller. At this time, the control signal generation circuit controls the external memory device so that the data is output to the bus controller in the order corresponding to the burst access request from the bus controller. This enables the bus controller to read the correct data according to the burst access request.

10 Claims, 28 Drawing Sheets

MEMORY CONTROLLER AND MEMORY CONTROL METHOD FOR CONTROLLING AN EXTERNAL MEMORY DEVICE TO BE ACCESSIBLE EVEN IN AN ADDRESSING MODE THAT IS NOT SUPPORTED THEREBY

BACKGROUND OF THE INVENTION

1. Field of the Invention

The present invention generally relates to a memory controller for controlling a burst-accessible external memory device. More particularly, the present invention relates to a memory controller for controlling an external memory device to be accessible even in an addressing mode that is not supported by the external memory device.

2. Description of the Background Art

With recent increase in operation speed of the processors mounted in the information processing units like personal computers and the electrical household appliances, fast access is increasingly required for the memories mounted in these apparatuses. Therefore, burst-accessible memories such as flash memory and ROM (Read Only Memory) are now increasingly developed.

FIG. 1 is a block diagram showing an exemplary structure of a burst-accessible external memory device 100. This external memory device 100 includes a cell matrix 101, a burst control circuit 102 for controlling addressing in burst access, an address incrementer 103 for generating an address in burst access, an address latch/decoder 104 for latching and decoding an external address or an address generated by the address incrementer 103, a data latch 105 for latching the data that is output from the cell matrix 101 according to the decode result of the address latch/decoder 104, an input/output (I/O) buffer 106 for receiving the external data and outputting the latched data in the data latch 105, and a control circuit 107 for controlling data input/output and the like.

The external memory device 100 receives signals XCS#, XRS#, XWS#, XAB[8:30], CLK and XADV# from a memory controller described below. The signal XCS# is a chip select signal for making the operation of each unit within the external memory device 100 valid. The signal XRS# is a read strobe signal indicating a data output period in read access. The signal XWS# is a write strobe signal indicating a write access period.

XAB [8:30] indicates an address bus for addressing the external memory device 100 to be accessed. XAB[8:30] refers to 23 bits of the address bus XAB8 to XAB30. Of XAB8 to XAB30, XAB8 represents the most significant bit, and XAB30 represents the least significant bit.

The signal CLK is a clock signal for use within the external memory device 100 in order to generate an address in burst access. The signal XADV# is an address valid signal for receiving and latching the address on XAB[8:30] into the external memory device 100.

XDB[0:15] indicates an external data bus for data input/output. XDB[0:15] refers to 16 bits of the data bus XDB0 to XDB15. Of XDB0 to XDB15, XDB0 represents the most significant bit, and XDB15 represents the least significant bit.

In the single access mode, the address latch/decoder 104 receives and latches an address on XAB[8:30] in response to assertion of the signal XADV#. The address latch/decoder 104 then decodes that address for output to the cell matrix 101. The cell matrix 101 selects a memory cell according to the decode result, and output the data to the data latch 105.

In the burst access mode, the address incrementer 103 fetches an address on XAB[8:30] in response to assertion of the signal XADV# in the first access. The address latch/decoder 104 receives the address that is output from the address incrementer 103. The address latch/decoder 104 then decodes that address for output to the cell matrix 101. The cell matrix 101 selects a memory cell according to the decode result, and output the data to the data latch 105.

In the second and following accesses, the address incrementer 103 increments the address in synchronization with the signal CLK for output to the address latch/decoder 104. The address latch/decoder 104 receives the address that is output from the address incrementer 103. The address latch/decoder 104 then decodes that address for output to the cell matrix 101. The cell matrix 101 selects a memory cell according to the decode result, and output the data to the data latch 105.

The operation of the address incrementer 103 varies depending on an addressing mode supported by the external memory device 100. Such addressing modes include: a Wrap mode that implements wraparound access capable of accessing only within a page boundary; and a Non-Wrap mode capable of accessing successive addresses regardless of the page boundary.

For example, in the case where the burst length is four words (16 bits/word), the lower address value that is output from the address incrementer 103 varies in the following manner in each of the addressing modes. Note that the starting address is 2.

Wrap mode: 2→3→0→1

Non-Wrap mode: 2→3→4→5

The control circuit 107 receives the signals XCS#, XRS# and XWS# from the memory controller, and generates a timing signal of the address latch/decoder 104, data latch 105 and I/O buffer 106.

FIG. 2 is a block diagram schematically showing the structure of the conventional memory controller for controlling the external memory device 100 of FIG. 1. This memory controller 200 includes a state machine 201 for causing state transition according to the operation mode of the external memory device 100, a wait setting register 202 in which is set the number of waits in accessing the external memory device 100 by a not-shown microprocessor or the like, a wait counter 203 for counting the number of waits that is set in the wait setting register 202, a burst counter 204 for counting the number of accesses in the burst access mode, a control signal generation circuit 205 for generating a control signal for controlling the external memory device 100 and a bus controller 300 according to the state of the state machine 201, and an address latch 206 for latching an address from the bus controller 300 for output to the external memory device 100.

The memory controller 200 receives signals EIHREQ, EIHBURST, EIHBCNT[0:2] and EIHAB[8:30] from the bus controller 300. The signal EIHREQ is a signal indicating an access request to an external bus from the bus controller 300. The external bus herein refers to a bus connected to the right side of the memory controller 200. The external memory device 100 and the like are connected to the external bus. An internal bus herein refers to a bus connected to the left side of the memory controller 200.

The signal EIHBURST is a signal indicating whether the access to the external memory device 100 is burst access or not. The signal EIHBCNT[0:2] is a signal indicating the burst length in burst access. EIHAB[8:30] indicates an internal address bus on which the address for access to the external bus (access to the external memory device 100 or the like) is output.

The state machine 201 causes state transition in each operation mode with reference to the signals EIHREQ and EIHBURST, a signal WCOUNT from the wait counter 203, and a signal BCOUNT from the burst counter 204. State transition of the state machine 201 will be described later.

The control signal generation circuit 205 generates signals CSHACK, CSHEVLD and CSHXVLD according to the state of the state machine 201 for output to the bus controller 300. The signal CSHACK is a signal for notifying the bus controller 300 of acknowledgement of the access request by the signal EIHREQ from the bus controller 300. The signal CSHXVLD is a signal indicating whether the data on the external data bus (XDB[0:15]) is valid or not. The signal CSHEVLD is a signal indicating whether the data on the internal data bus (EIHDB[0:15]) is valid or not.

The control signal generation circuit 205 generates the signals XCS#, XRS#, XWS# and XADV# (which are defined above) according to the state of the state machine 201 for output to the external memory device 100.

The wait counter 203 counts the number of waits in accessing to the external memory device 100 with reference to the number of waits that is set in the wait setting register 202. The burst counter 204 receives the value of the signal EIHBCNT[0:2] as an initial value at the start of burst access, and counts the number of accesses to the external memory device 100. The address latch 206 receives and latches an address that is output from the bus controller 300 onto EIHAB[8:30], and outputs that address onto XAB[8:30].

The memory controller 200 has two operation modes: a single access mode and a burst access mode. In the single access mode, the memory controller 200 executes a single access to the external memory device 100 in response to each access request. In the burst access mode, the memory controller 200 successively executes a plurality of accesses to the external memory device 100 in response to each access request, allowing for fast access. When the signals EIHREQ and EIHBURST are both asserted simultaneously, the memory controller 200 determines that the operation mode is the burst access mode, and operates in the burst access mode. When only the signal EIHREQ is asserted, the memory controller 200 determines that the operation mode is the single access mode, and operates in the single access mode.

(1) Single Access Mode

FIG. 3 is a diagram showing the state transition of the memory controller 200 in the single access mode. Note that the state transition of the state machine 201 occurs in synchronization with the signal CLK.

The state machine 201 is in the IDLE state when being ready to accept an access request from the bus controller 300. When only the signal EIHREQ is asserted (EIHREQ=1, EIHBURST=0), the state machine 201 transitions to the START state. The START state corresponds to a cycle in which assertion of the signal XCS# is started. One cycle of the START state is always inserted for every access request.

If the count value WCOUNT of the wait counter 203 is not "0" (WCOUNT≠0), the state machine 201 transitions to the WAIT state in the following cycle. The WAIT state is repeated until WCOUNT becomes "0". In other words, as many access waits as the number of waits in the wait setting register 202 are inserted.

When WCOUNT is "0" in the START state, or when WCOUNT is "0" in the WAIT state, the state machine 201 transitions to the END state in the following cycle. The END state is a cycle in which bus access is terminated. One cycle of the END state is always inserted at the end of the bus access. In this cycle, the data on XDB[0:15] is rendered valid, whereby the access to the external memory device 100 is completed. The state machine 201 transitions to the IDLE state in the following cycle. The IDLE state is repeated until another access request is output from the bus controller 300.

FIG. 4 is a timing chart illustrating the operation of the memory controller 200 in the single access mode. This timing chart indicates a read operation, and the number of access waits is two cycles.

If the bus controller 300 asserts the signal EIHREQ while the state machine 201 is in the IDLE state (C2), the control signal generation circuit 205 asserts the signal CSHACK in this cycle in order to notify the bus controller 300 of acknowledgement of the access request.

The state machine 201 then transitions to the START state (C3), and the control signal generation circuit 205 responsively starts asserting the signals XCS# and XRS#. In this cycle, the address latch 206 receives an address that is output onto EIHAB[8:30]. The address latch 206 outputs that address onto XAB[8:30], and the control signal generation circuit 205 asserts the signal XADV#. The wait counter 203 receives the number of waits that is set in the wait setting register 202.

The wait counter 203 starts down-counting as soon as the state machine 201 transitions to the WAIT state in the following cycle (C4). As many wait cycles (C4, C5) as the number of waits in the wait setting register 202 are inserted.

The state machine 201 transitions to the END state in the following cycle (C6). In this cycle, the control signal generation circuit 205 asserts the signal CSHXVLD in order to notify the bus controller 300 that the data output onto XDB[0:15] is valid.

In response to the notification from the memory controller 200, the bus controller 300 receives the data on XDB[0:15] in the following cycle (C7) for output onto EIHDB[0:15]. In this cycle, the control signal generation circuit 205 asserts the signal CSHEVLD in order to notify the bus controller 300 that the data output onto EIHDB[0:15] is valid. In this cycle, the control signal generation circuit 205 negates the signals XCS# and XRS#, thereby completing the access to the external memory device 100. Note that the count value BCOUNT of the burst counter 204 is not used in the single access mode.

(2) Burst Access Mode

FIG. 5 is a diagram showing the state transition of the memory controller 200 in the burst access mode. When the signals EIHREQ and EIHBURST are asserted in the IDLE state (EIHREQ=1, EIHBURST=1), the state machine 201 transitions to the START state. The START state corresponds to a cycle in which assertion of the signal XCS# is started. One cycle of the START state is always inserted for every access request.

If the count value WCOUNT of the wait counter 203 is not "0" (WCOUNT≠0), the state machine 201 transitions to the WAIT state in the following cycle. The WAIT state is repeated until WCOUNT becomes "0". In other words, as many access waits as the number of waits in the wait setting register 202 are inserted.

When BCOUNT is "0" (BCOUNT=0) in the START state, the state machine 201 transitions to the END state in the following cycle.

When WCOUNT is "0" (WCOUNT=0) in the START state or when WCOUNT is "0" and BCOUNT is not "0" (WCOUNT=0, BCOUNT≠0) in the WAIT state, the state machine 201 transitions to the BURST state in the following cycle. The BURST state is repeated until BCOUNT becomes "0". In other words, the BURST state is repeated as much as the burst length of the signal EIHBCNT[0:2]. In the BURST state, successive addresses of the external memory device 100 are accessed in synchronization with the signal CLK.

When WCOUNT and BCOUNT are "0" (WCOUNT=0, BCOUNT=0) in the WAIT state, or when BCOUNT is "0" (BCOUNT=0) in the BURST state, the state machine 201 transitions to the END state. The END state is a cycle in which bus access is terminated. One cycle of the END state is always inserted at the end of the bus access. Burst access to the external memory device 100 is thus completed in this cycle. The state machine 201 transitions to the IDLE state in the following cycle. The IDLE state is repeated until another access request is output from the bus controller 300.

FIG. 6 is a timing chart illustrating the operation of the memory controller 200 in the burst access mode. This timing chart indicates a read operation, wherein the number of access waits is two cycles, and the burst length is four words.

If the bus controller 300 asserts the signals EIHREQ and EIHBURST simultaneously while the state machine 201 is in the IDLE state (C2), the state machine 201 determines that the request is a burst access request, and sets the operation mode to the burst access mode. The control signal generation circuit 205 asserts the signal CSHACK in this cycle in order to notify the bus controller 300 of acknowledgement of the access request. In the case of the burst access request, the signals EIHREQ and EIHBURST are kept asserted until burst access is completed.

The state machine 201 then transitions to the START state (C3), and the control signal generation circuit 205 responsively starts asserting the signals XCS# and XRS#. In this cycle, the address latch 206 receives an address that is output onto EIHAB[8:30]. The address latch 206 outputs that address onto XAB[8:30], and the control signal generation circuit 205 asserts the signal XADV#. The wait counter 203 receives the number of waits that is set in the wait setting register 202. The burst counter 204 receives the burst length of the signal EIHBCNT[0:2]. Note that the burst length of the signal EIHBCNT[0:2] is (an expected burst length −1).

The wait counter 203 starts down-counting as soon as the state machine 201 transitions to the WAIT state in the following cycle (C4). As many wait cycles (C4, C5) as the number of waits in the wait setting register 202 are inserted.

The burst counter 204 starts down-counting as soon as the state machine 201 transitions to the BURST state in the following cycle (C6). In this cycle, the control signal generation circuit 205 asserts the signal CSHXVLD in order to notify the bus controller 300 that the data output onto XDB[0:15] is valid.

In response to the notification from the memory controller 200, the bus controller 300 receives the data on XDB[0:15] in the following cycle (C7) for output onto EIHDB[0:15]. In this cycle, the control signal generation circuit 205 asserts the signal CSHEVLD in order to notify the bus controller 300 that the data output onto EIHDB[0:15] is valid.

In the cycles C7 and C8, the control signal generation circuit 205 retains the values of the signals XCS# and XRS#, thereby allowing the external memory device 100 to access to successive addresses.

The state machine 201 transitions to the END state in the following cycle (C9).

The state machine 201 transitions to the IDLE state in the following cycle (C10). In this cycle, the control signal generation circuit 205 negates the signals XCS# and XRS#, thereby completing the burst access to the external memory device 100. The control signal generation circuit 205 also negates the signal CSHXVLD in this cycle.

In the following cycle (C11), the control signal generation circuit 205 negates the signal CSHEVLD in order to notify the bus controller 300 that the data on EIHDB[0:15] is no longer valid.

As described above, the external memory device 100 includes the address incrementer 103 therein, allowing for fast access to successive addresses in synchronization with a clock signal.

However, some external memory devices support either the Wrap mode or Non-Wrap mode, or have a different burst length. If the memory controller 200 conducts burst access in an addressing mode or with a burst length that is not supported by the external memory device 100, a desired address is not accessed, causing malfunction of the microprocessor or erroneous data processing due to the wrong data being read.

SUMMARY OF THE INVENTION

It is an object of the invention to provide a memory controller that enables a bus controller to read the correct data even when an access request from the bus controller corresponds to an access mode that is not supported by an external memory device.

It is another object of the invention to provide a memory controller that enables a bus controller to rapidly read the correct data even when an access request from the bus controller corresponds to an access mode that is not supported by an external memory device.

According to one aspect of the invention, a memory controller for controlling access to a burst-accessible memory according to an access request from a bus controller includes: a detection circuit for detecting that a burst access request from the bus controller corresponds to an access mode that is not supported by the memory; and a control circuit for accessing the memory in an access mode different from that of the burst access request from the bus controller according to the detection result of the detection circuit, and controlling data output so that data is output to the bus controller in an order corresponding to the burst access request.

The control circuit accesses the memory in an access mode different from that of the burst access request from the bus controller, and controls data output so that the data is output to the bus controller in the order corresponding to the burst access request. This enables the bus controller to read the correct data according to the burst access request.

According to another aspect of the invention, a memory control method for controlling access to a burst-accessible memory according to an access request from a bus controller includes the steps of: detecting that a burst access request from the bus controller corresponds to an access mode that is not supported by the memory; and accessing the memory in an access mode different from that of the burst access request from the bus controller according to the detection result, and controlling data output so that data is output to the bus controller in an order corresponding to the burst access request.

The memory is accessed in an access mode different from that of the burst access request from the bus controller, and data output is controlled so that the data is output to the bus controller in the order corresponding to the burst access request. This enables the bus controller to read the correct data according to the burst access request.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
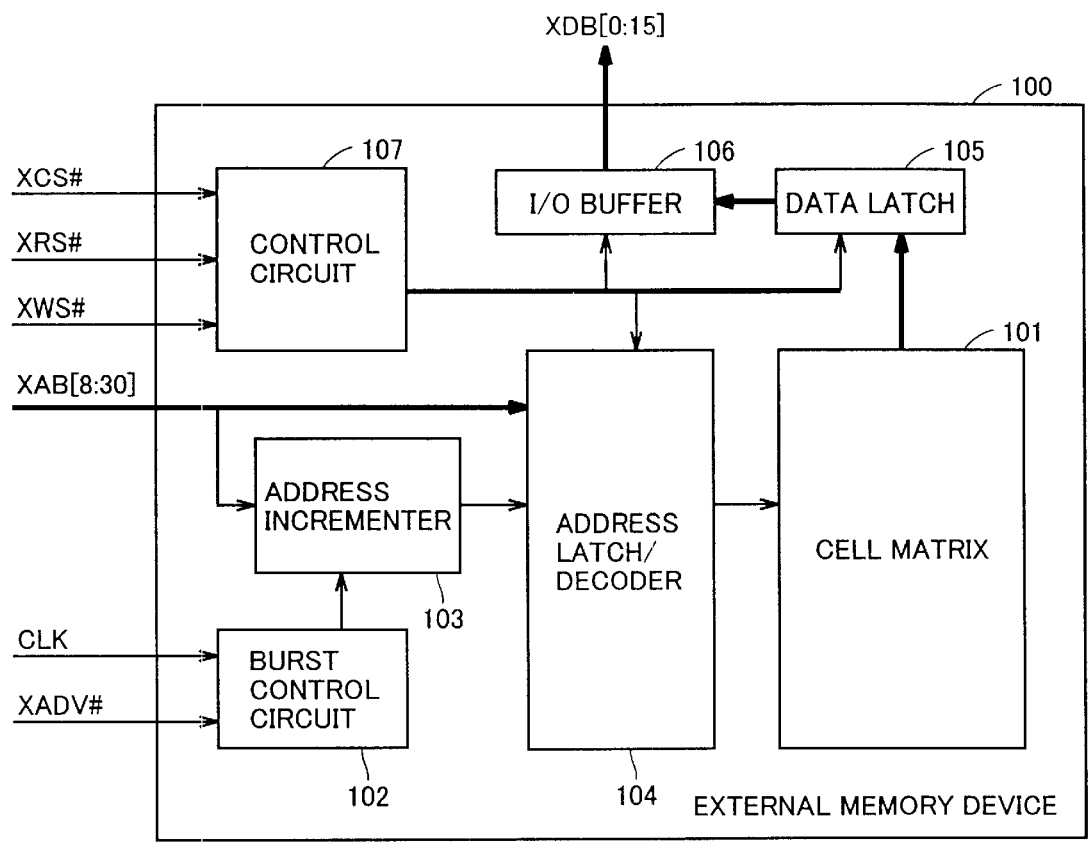
FIG. 1 is a block diagram showing an exemplary structure of a burst-accessible external memory device 100.
Figure 2:
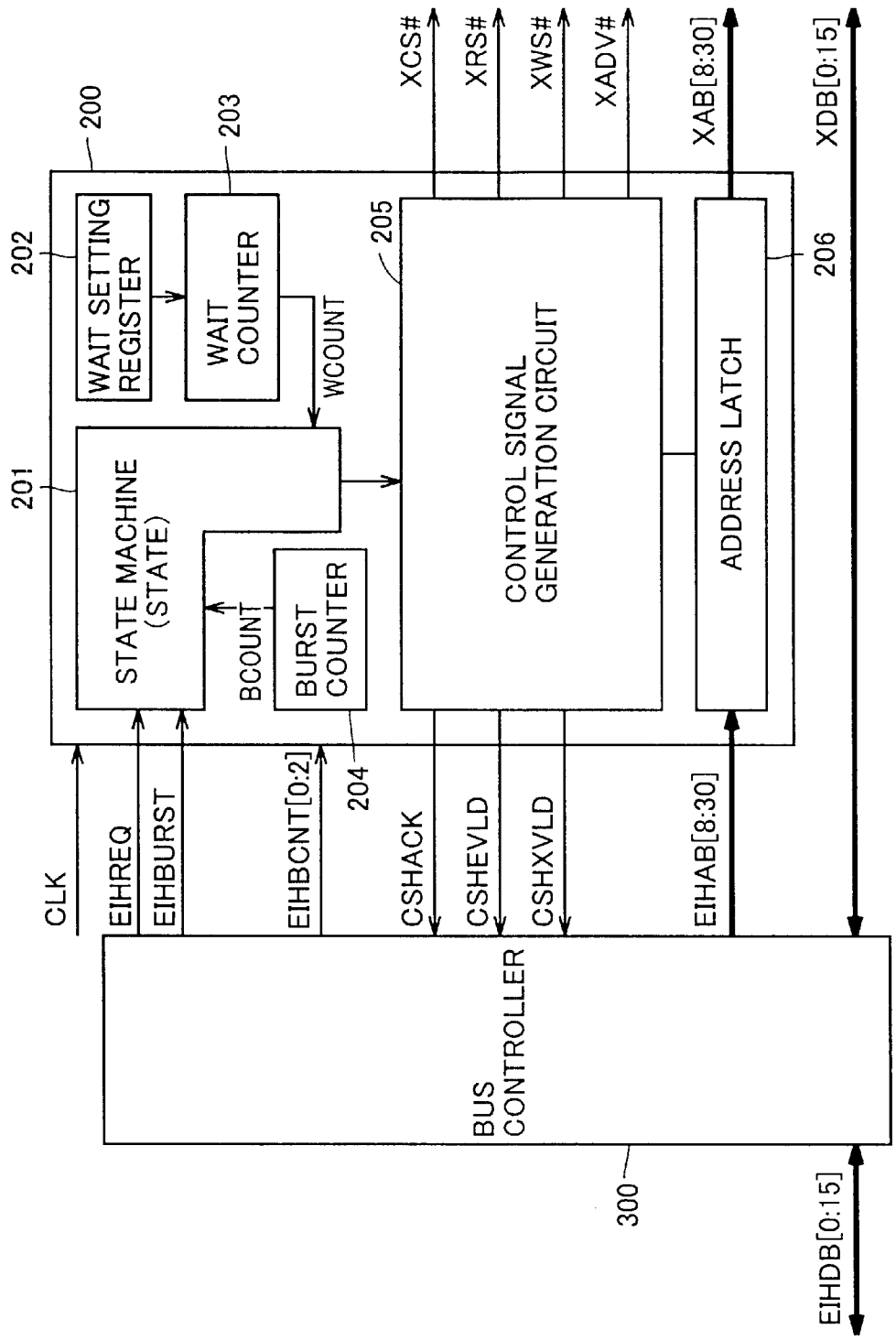
FIG. 2 is a block diagram schematically showing the structure of a conventional memory controller for controlling the external memory device 100 of FIG. 1.
Figure 7:
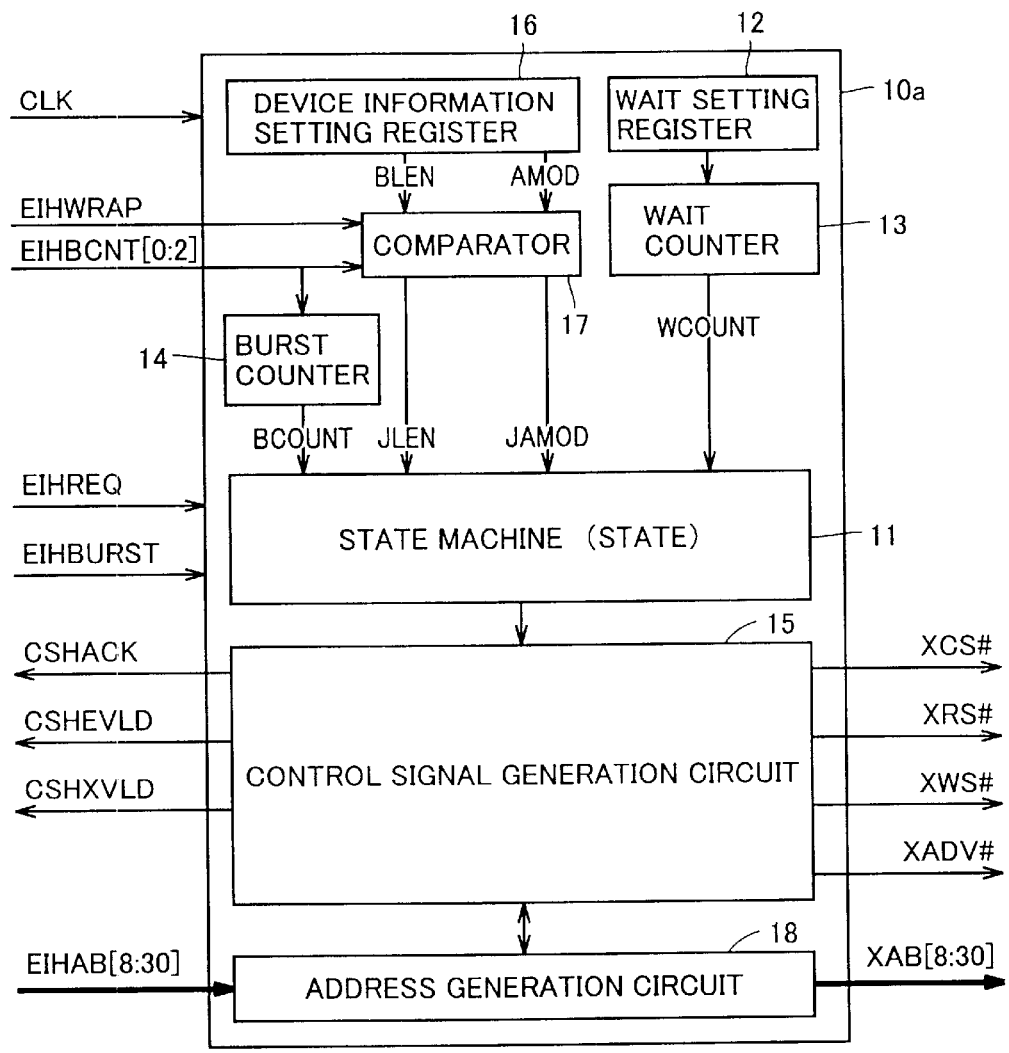
FIG. 7 is a block diagram schematically showing the structure of a memory controller 10a according to a first embodiment of the present invention.

FIG. 7 is a block diagram schematically showing the structure of a memory controller 10a according to the first embodiment of the present invention. Note that the memory controller 10a of FIG. 7 operates with the external memory device 100 of FIG. 1 and the bus controller of FIG. 2 being connected thereto. The bus controller of the present embodiment is different from that of FIG. 2 in that a signal EIHWRAP indicating the type of addressing mode (Wrap mode/Non-Wrap mode) is added, and that the bus controller of the present embodiment outputs the type of addressing mode at the same timing as that of the signals EIHREQ and EIHBURST. Accordingly, the bus controller of the present embodiment is denoted with "300'", and regarding the same structure and function, detailed description will not be repeated.

The memory controller 10a includes a state machine 11 for causing state transition according to the operation mode of the external memory device 100, a wait setting register 12 in which is set the number of waits in accessing the external memory device 100 by a not-shown microprocessor or the like, a wait counter 13 for counting the number of waits that is set in the wait setting register 12, a burst counter 14 for counting the number of accesses in the burst access mode, a control signal generation circuit 15 for generating a control signal for controlling the external memory device 100 and the bus controller 300' according to the state of the state machine 11, a device information setting register 16 in which information on the external memory device 100 is set, a comparator 17 for comparing the information that is set in the device information setting register 16 with a signal that is output from the bus controller 300', and an address generation circuit 18 for generating an address to be output to the external memory device 100.

The device information setting register 16 stores information on the external memory device 100. The information that is set in the device information setting register 16 includes a bit BLEN for setting the burst length of the external memory device 100 and a bit AMOD for setting an addressing mode (Wrap mode/Non-Wrap mode).

The allowable number of burst accesses to the external memory device 100 is set to the bit BLEN. The value of (an expected value −1) is set as the allowable number of burst accesses. For example, when the allowable number of burst accesses is "4", "3" is set to the bit BLEN. For the bit AMOD, "1" is set in the case of the Wrap mode, and "0" is set in the case of the Non-Wrap mode. Note that this device information is set by a not-shown microprocessor or the like.

The comparator 17 compares the bit BLEN in the device information setting register 16 with a signal EIHBCNT[0:2] from the bus controller 300', and outputs the comparison result as a signal JLEN. The comparator 17 also compares the bit AMOD in the device information setting register 16 with a signal EIHWRAP from the bus controller 300', and outputs the comparison result as a signal JAMOD.

The state machine 11 causes state transition in each operation mode with reference to the signals EIHREQ and EIHBURST, the signal WCOUNT from the wait counter 13, the signal BCOUNT from the burst counter 14 and the signals JLEN and JAMOD from the comparator 17. State transition of the state machine 11 will be described later.

The control signal generation circuit 15 generates signals CSHACK, CSHEVLD and CSHXVLD according to the state of the state machine 11 for output to the bus controller 300'. The control signal generation circuit 15 also generates signals XCS#, XRS#, XWS# and XADV# according to the state of the state machine 11 for output to the external memory device 100.

The wait counter 13 counts the number of waits in accessing the external memory device 100 with reference to the number of waits that is set in the wait setting register 12. The burst counter 14 receives the value of the signal EIHBCNT[0:2] as an initial value at the start of burst access, and counts the number of accesses to the external memory device 100. The address generation circuit 18 generates an address based on the addressing mode for output to the external memory device 100.

Figure 8:
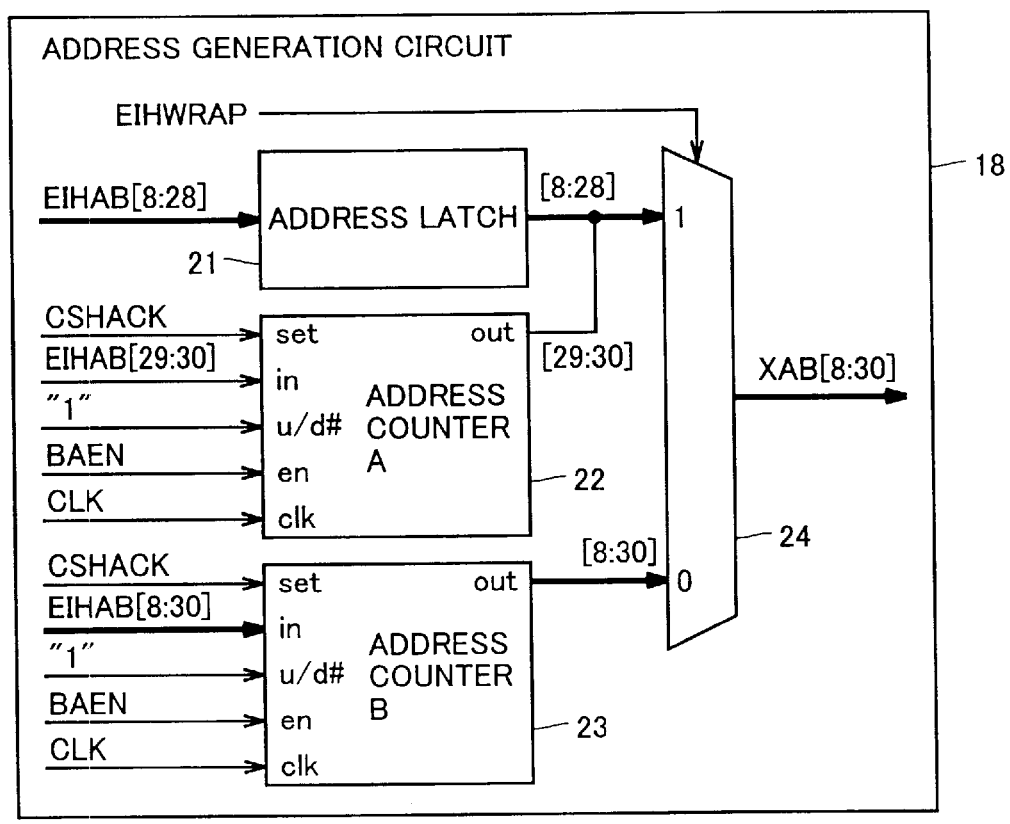
FIG. 8 is a block diagram schematically showing the structure of an address generation circuit 18 of FIG. 7.

FIG. 8 is a block diagram schematically showing the structure of the address generation circuit 18 of FIG. 7. The address generation circuit 18 includes an address latch 21 for receiving and latching an address that is output from the bus controller 300' onto EIHAB[8:28], an address counter A 22 for generating the lower two bits of the address to be output to the external memory device 100 in the Wrap mode, an address counter B 23 for generating an address to be output to the external memory device 100 in the Non-Wrap mode, and a selector 24 for switching and outputting the address according to the signal EIHWRAP from the bus controller 300'.

The address counter A 22 receives the value on EIHAB [29:30] in response to assertion of the signal CSHACK. When a signal BAEN is "1", the address counter A 22 conducts up-counting in synchronization with the signal CLK. The address counter A 22 generates the lower address (two bits) in the Wrap mode, which is for the burst length of four words. Another burst length can be supported by changing the number of bits of the address counter A 22.

The address counter B 23 receives the value on EIHAB [8:30] in response to assertion of the signal CSHACK. When the signal BAEN is "1", the address counter B 23 conducts up-counting in synchronization with the signal CLK. The address counter B 23 generates an address in the Non-Wrap mode.

When the signal EIHWRAP is "1", the selector 24 selects the upper 21-bit address [8:28] that is output from the address latch 21 and the lower 2-bit address [29:30] that is output from the address counter A 22 for output onto XAB[8:30]. When the signal EIHWRAP is "0", the selector 24 selects the 23-bit address [8:30] that is output from the address counter B 23 for output onto XAB[8:30].

(1) Determination of Operation Mode

If the signal EIHBURST is not asserted at the time the signal EIHREQ is asserted, the memory controller 10a determines that the request is a single access mode request, and executes access to the external memory device 100 in the single access mode.

When the signals EIHREQ and EIHBURST are both asserted simultaneously, the memory controller 10a determines that the request is a burst access mode request. The comparator 17 compares the bit AMOD in the device information setting register 16 with the signal EIHWRAP from the bus controller 300'. When the bit AMOD matches the signal EIHWRAP, the comparator 17 outputs "1" as the signal JAMOD. Otherwise, the comparator 17 outputs "0" as the signal JAMOD.

The comparator 17 also compares the bit BLEN in the device information setting register 16 with the signal EIHBCNT[0:2] from the bus controller 300'. When the bit BLEN matches the signal EIHBCNT[0:2], the comparator 17 outputs "1" as the signal JLEN. Otherwise, the comparator 17 outputs "0" as the signal JLEN. Only when the signals JAMOD and JLEN are both "1", the state machine 11 determines that the operation mode is the burst access mode, and executes access to the external memory device 100 in the burst access mode. Otherwise, the state machine 11 determines that the operation mode is the single access mode, and executes access to the external memory device 100 in the single access mode.

Note that when it is determined that the operation mode is the burst access mode, an addressing mode (Wrap mode/Non-Wrap mode) is determined according to the bit AMOD.

(2) Single Access Mode Operation for a Single Access Request

Figure 9:
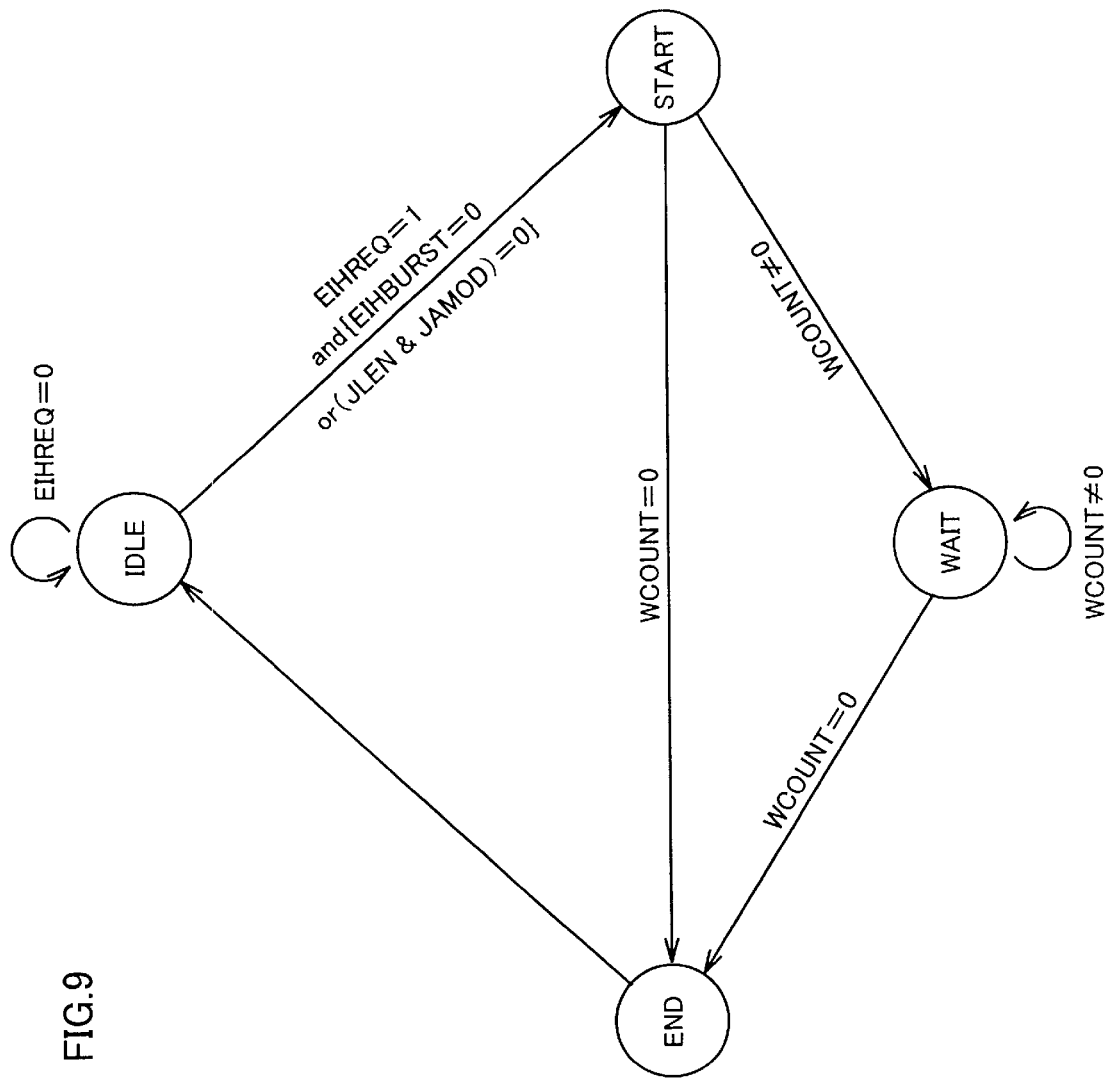
FIG. 9 is a diagram showing the state transition of the memory controller 10a in the single access mode.

FIG. 9 is a diagram showing the state transition of the memory controller 10a in the single access mode. Note that the state transition of the state machine 11 occurs in synchronization with the signal CLK.

The state machine 11 is in the IDLE state when being ready to accept an access request from the bus controller 300'. When the signal EIHBURST is not asserted at the time the signal EIHREQ is asserted, or when the AND value of the signals JLEN and JAMOD is "0", the state machine 11 transitions to the START state. The START state corresponds to a cycle in which assertion of the signal XCS# is started. One cycle of the START state is always inserted for every access request.

If the count value WCOUNT of the wait counter 13 is not "0" (WCOUNT≠0), the state machine 11 transitions to the WAIT state in the following cycle. The WAIT state is repeated until WCOUNT becomes "0". In other words, as many access waits as the number of waits in the wait setting register 12 are inserted.

When WCOUNT is "0" in the START state, or when WCOUNT is "0" in the WAIT state, the state machine 11 transitions to the END state in the following cycle. The END state is a cycle in which bus access is terminated. One cycle of the END state is always inserted at the end of the bus access. In this cycle, the data on XDB[0:15] is rendered valid, whereby the access to the external memory device 100 is completed. The state machine 11 transitions to the IDLE state in the following cycle. The IDLE state is repeated until another access request is output from the bus controller 300'.

The single access mode operation of the memory controller 10a of the present embodiment in response to a single access request is the same as that of the conventional memory controller 200 described in connection with the timing chart of FIG. 4. Therefore, detailed description thereof will not be repeated.

(3) Burst Access Mode Operation for a Burst Access Request (Wrap Mode)

Figure 10:
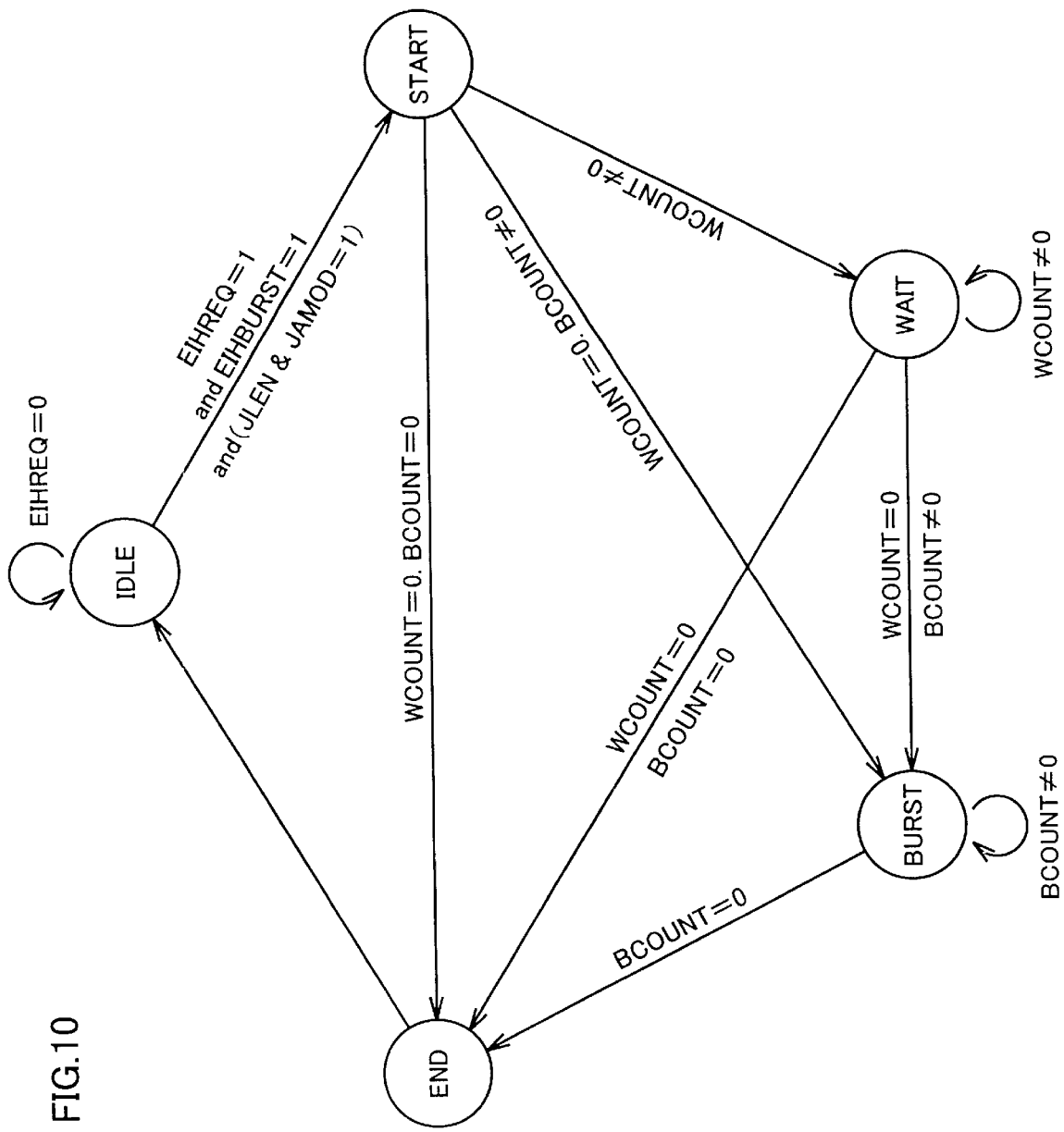
FIG. 10 is a diagram showing the state transition of the memory controller 10a in the burst access mode (Wrap mode).

FIG. 10 is a diagram showing the state transition of the memory controller 10a in the burst access mode (Wrap mode). When the signals EIHREQ and EIHBURST are both asserted as well as the AND value of the signals JLEN and JAMOD is "1" in the IDLE state, the state machine 11 transitions to the START state. The START state corresponds to a cycle in which assertion of the signal XCS# is started. One cycle of the START state is always inserted for every burst access request.

If the count value WCOUNT of the wait counter 13 is not "0" (WCOUNT≠0), the state machine 11 transitions to the WAIT state in the following cycle. The WAIT state is repeated until WCOUNT becomes "0". In other words, as many access waits as the number of waits in the wait setting register 12 are inserted.

When WCOUNT and BCOUNT are "0" (WCOUNT=0, BCOUNT=0) in the START state, the state machine 11 transitions to the END state in the following cycle.

When WCOUNT is "0" and BCOUNT is not "0" (WCOUNT=0, BCOUNT≠0) in the START state, or when WCOUNT is "0" and BCOUNT is not "0" (WCOUNT=0, BCOUNT≠0) in the WAIT state, the state machine 11 transitions to the BURST state in the following cycle. The BURST state is repeated until BCOUNT becomes "0". In other words, the BURST state is repeated as much as the burst length of the signal EIHBCNT[0:2]. In the BURST state, successive addresses of the external memory device 100 are accessed in synchronization with the signal CLK.

When WCOUNT and BCOUNT are "0" (WCOUNT=0, BCOUNT=0) in the WAIT state, or when BCOUNT is "0" (BCOUNT=0) in the BURST state, the state machine 11 transitions to the END state. The END state is a cycle in which bus access is terminated. One cycle of the END state is always inserted at the end of the bus access. The burst access to the external memory device 100 is thus completed. The state machine 11 transitions to the IDLE state in the following cycle. The IDLE state is repeated until another access request is output from the bus controller 300'.

Figure 11:
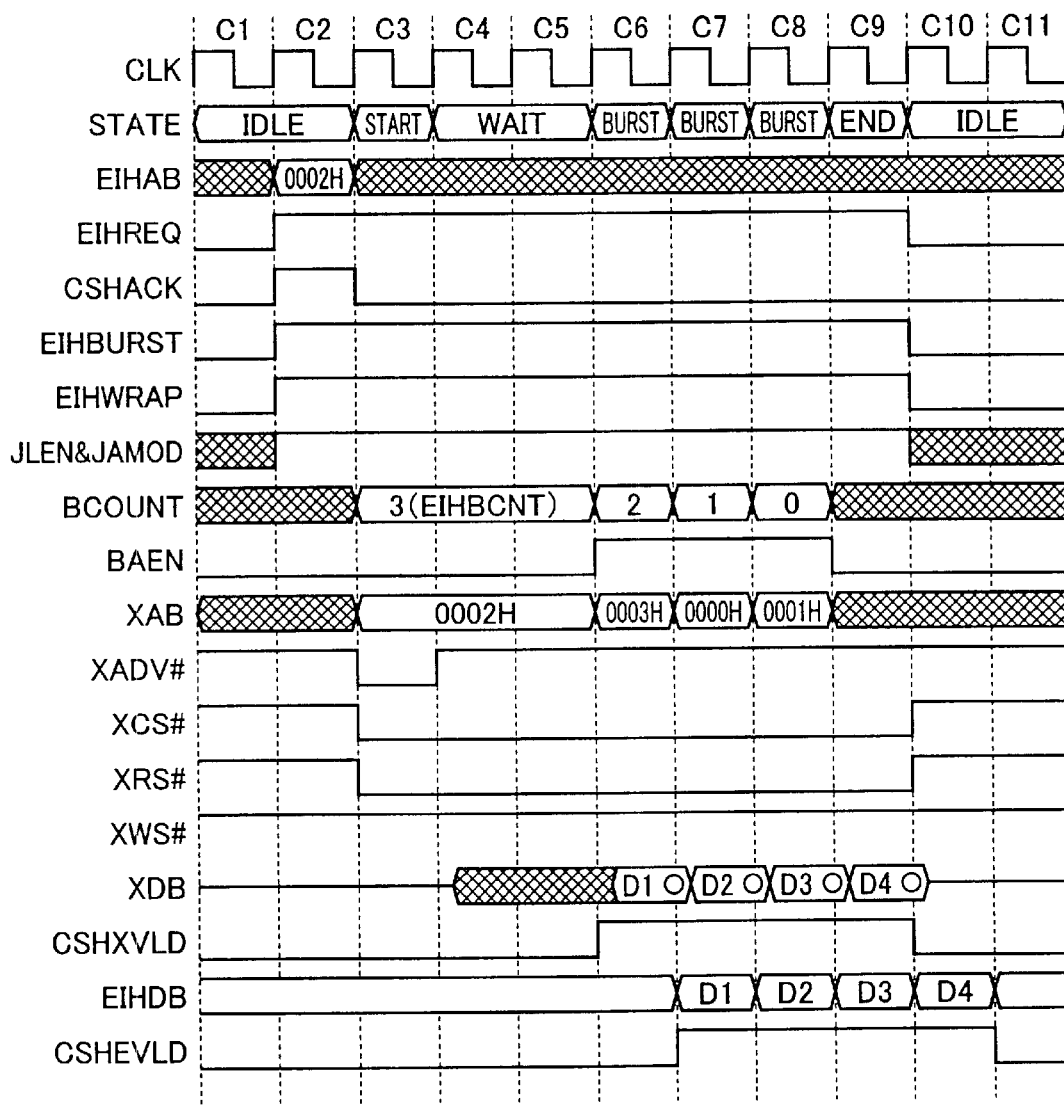
FIG. 11 is a timing chart illustrating the operation of the memory controller 10a in the burst access mode (Wrap mode).

FIG. 11 is a timing chart illustrating the operation of the memory controller 10a in the burst access mode (Wrap mode). This timing chart indicates a read operation, wherein the number of access waits is two cycles, and the burst length is four words.

It is now assumed that the bus controller 300' asserts the signals EIHREQ and EIHBURST simultaneously while the state machine 11 is in the IDLE state (C2). If the AND value of the signals JLEN and JAMOD is "1" and the signal EIHWRAP is "1" at this time, the state machine 11 determines that the request is a Wrap mode burst access request, and sets the operation mode to the Wrap mode. The control signal generation circuit 15 asserts the signal CSHACK in this cycle in order to notify the bus controller 300' of acknowledgement of the access request. In the case of the Wrap mode burst access request, the signals EIHREQ and EIHBURST are kept asserted until Wrap mode burst access is completed.

The state machine 11 then transitions to the START state (C3), and the control signal generation circuit 15 responsively starts asserting the signals XCS# and XRS#. In this cycle, the address generation circuit 18 receives an address that is output onto EIHAB[8:28], and outputs that address onto XAB[8:28]. The address generation circuit 18 also outputs the count value of the address counter A 22 onto XAB[29:30], and the control signal generation circuit 15 asserts the signal XADV#. The wait counter 13 receives the number of waits that is set in the wait setting register 12. The burst counter 14 receives the burst length of the signal EIHBCNT[0:2]. Note that the value "2" on EIHAB[29:30] is set to the address counter A 22, and "2" is output onto XAB[8:30] in this cycle.

The wait counter 13 starts down-counting as soon as the state machine 11 transitions to the WAIT state in the following cycle (C4). As many wait cycles (C4, C5) as the number of waits in the wait setting register 12 are inserted.

The burst counter 14 starts down-counting and the address counter A 22 starts up-counting as soon as the state machine 11 transitions to the BURST state in the following cycle (C6). The count value of the address counter A 22 is updated to "3", and "3" is output onto XAB[29:30]. In this cycle, the control signal generation circuit 15 asserts the signal CSHX-VLD in order to notify the bus controller 300' that the data output onto XDB[0:15] is valid.

In response to the notification from the memory controller 10a, the bus controller 300' receives the data on XDB[0:15] in the following cycle (C7) for output onto EIHDB[0:15]. In this cycle, the memory controller 10a outputs "0" onto XAB[29:30] and asserts the signal CSHEVLD in order to notify the bus controller 300' that the data output onto EIHDB[0:15] is valid.

In the cycles C7 and C8, the control signal generation circuit 15 retains the values of the signals XCS# and XRS#, thereby allowing the external memory device 100 to access to successive addresses. Note that, in the cycle C8, "1" is output onto XAB[29:30].

The state machine 11 transitions to the END state in the following cycle (C9).

The state machine 11 transitions to the IDLE state in the following cycle (C10). In this cycle, the control signal generation circuit 15 negates the signals XCS# and XRS#, thereby completing the burst access to the external memory device 100. The control signal generation circuit 15 also negates the signal CSHXVLD in this cycle.

In the following cycle (C11), the control signal generation circuit 15 negates the signal CSHEVLD in order to notify the bus controller 300' that the data on EIHDB[0:15] is no longer valid.

(4) Burst Access Mode Operation for a Burst Access Request (Non-Wrap Mode)

The state transition diagram of the memory controller 10a in the burst access mode (Non-Wrap mode) is the same as that of FIG. 10. Therefore, detailed description thereof will not be repeated.

Figure 12:
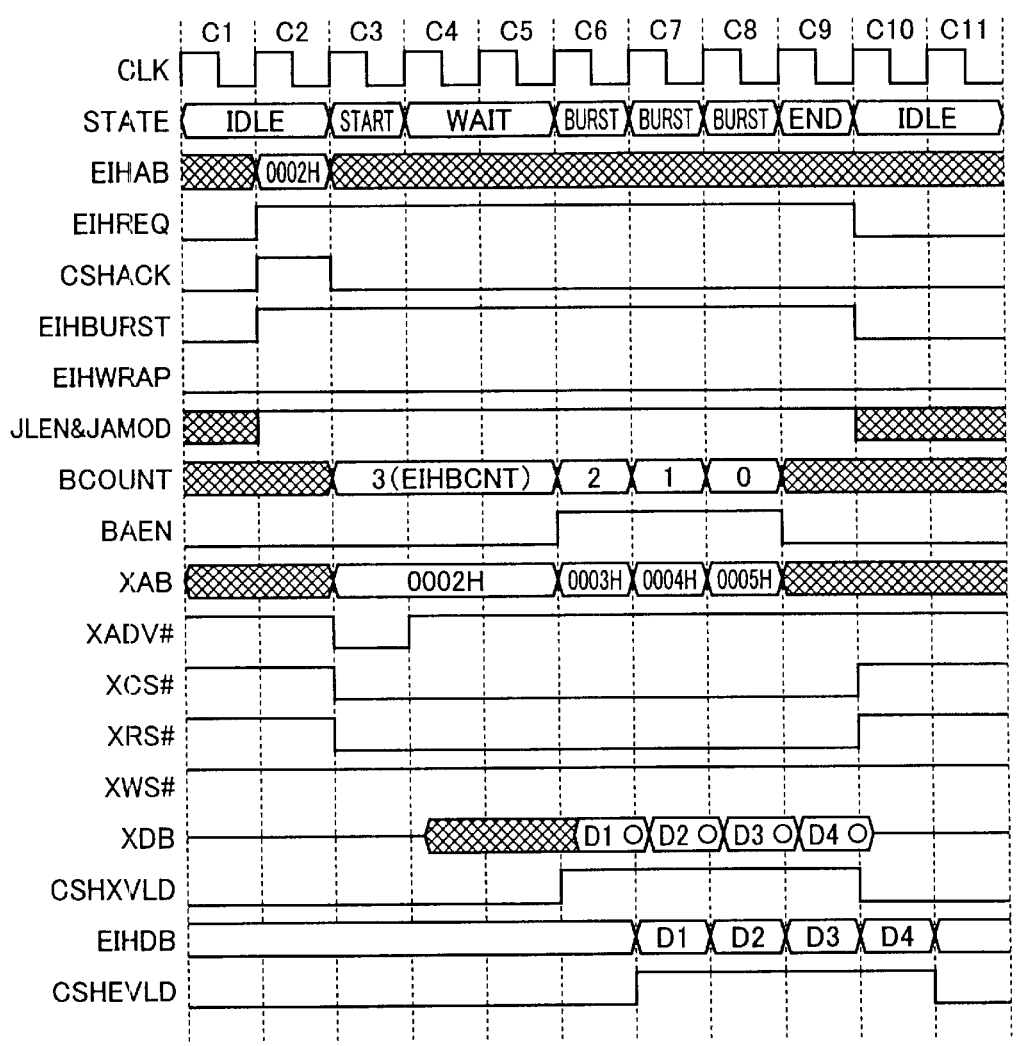
FIG. 12 is a timing chart illustrating the operation of the memory controller 10a in the burst access mode (Non-Wrap mode).

FIG. 12 is a timing chart illustrating the operation of the memory controller 10a in the burst access mode (Non-Wrap mode). This timing chart is the same as that in the Wrap mode shown in FIG. 11 except that the signal EIHWRAP is "0" and that the lower address on XAB[8:30] changes like "2→3→4→5" (see C6 to C8 in FIG. 12). Therefore, detailed description thereof will not be repeated.

(5) Single Access Mode Operation for a Burst Access Request

If the aforementioned conditions for the burst access mode operation are not satisfied despite the fact that a burst access request has been output from the bus controller 300' (EIHBURST=1), the single access mode operation is repeated until the count value BCOUNT of the burst counter 14 becomes "0". Note that, in this case, the state transition of the state machine 11 occurs according to the state transition diagram of FIG. 9.

Figure 13:
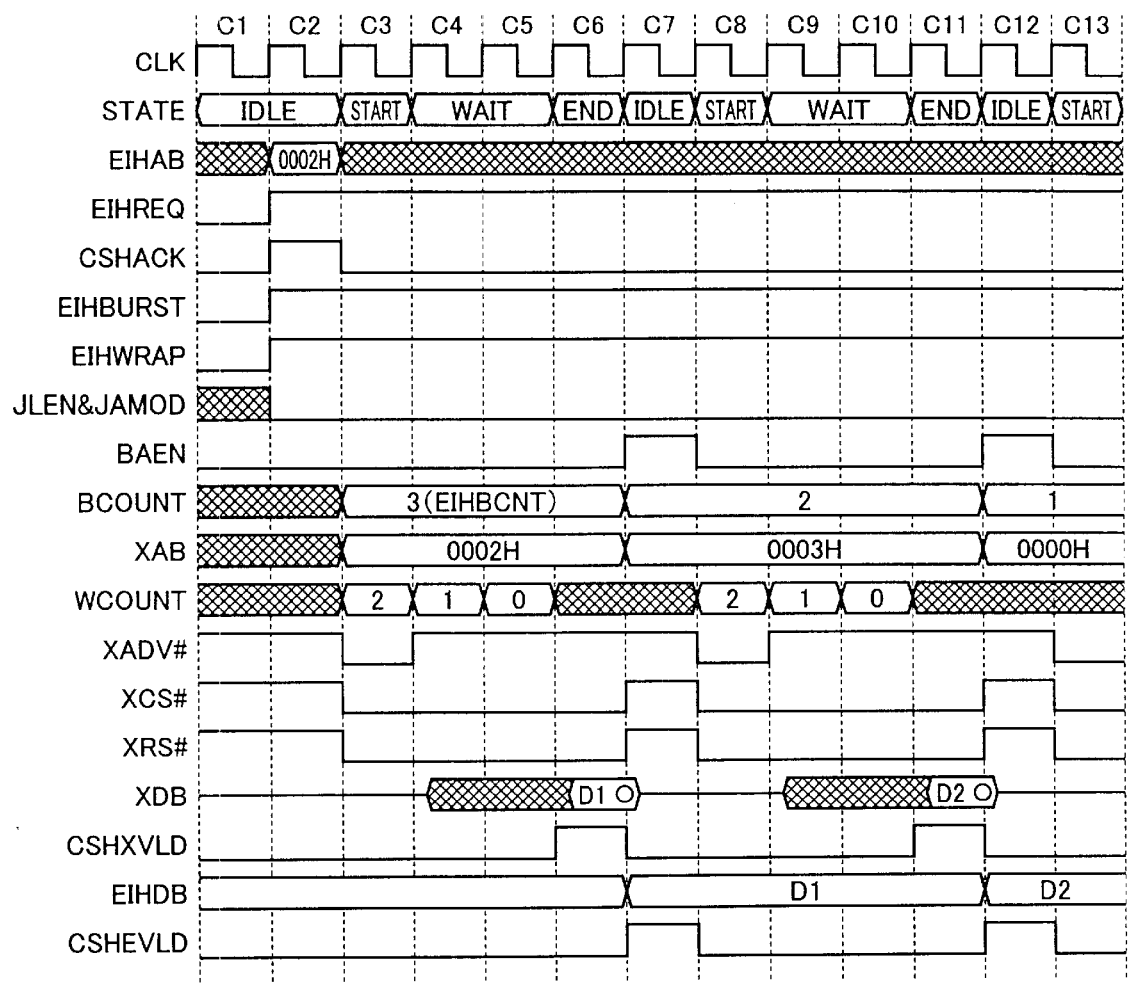
FIG. 13 is a timing chart illustrating the operation of the memory controller 10a for conducting the single access mode operation for a burst access request.

FIG. 13 is a timing chart illustrating the operation of the memory controller 10a for conducting the single access mode operation for a burst access request. If the bus controller 300' asserts the signals EIHREQ and EIHBURST while the state machine 11 is in the IDLE state, it is then determined whether the conditions for the burst access mode operation are satisfied or not (C2). In this cycle, the control signal generation circuit 15 asserts the signal CSHACK in order to notify the bus controller 300' of acknowledgement of the access request.

Since the conditions for the burst access mode operation are not satisfied, the single access mode operation is started. When the state machine 11 transitions to the START state (C3), the control signal generation circuit 15 starts asserting the signals XCS# and XRS#. In this cycle, the address generation circuit 18 outputs onto XAB[8:30] the address in the Wrap mode that is output from the address latch 21 and the address counter A 22, and the control signal generation circuit 15 asserts the signal XADV#. The wait counter 13 receives the number of waits that is set in the wait setting register 12.

The wait counter 13 starts down-counting as soon as the state machine 12 transitions to the WAIT state in the following cycle (C4). As many wait cycles (C4, C5) as the number of waits in the wait setting register 12 are inserted.

The state machine 11 transitions to the END state in the following cycle (C6). In this cycle, the control signal generation circuit 15 asserts the signal CSHXVLD in order to notify the bus controller 300' that the data output onto XDB[0:15] is valid.

In the following cycle (C7), the state machine 11 transitions back to the IDLE state. In this cycle, the signals XCS# and XRS# are negated and the signal BAEN is asserted. The burst counter 14 conducts down-counting to update BCOUNT to "2", whereas the address counter A 22 conducts up-counting to update the lower address [29:30] to "3".

In response to the notification from the memory controller 10a, the bus controller 300' receives the data on XDB[0:15] in this cycle (C7) for output onto EIHDB[0:15]. The memory controller 10a asserts the signal CSHEVLD in order to notify the bus controller 300' that the data output onto EIHDB[0:15] is valid.

In the following cycle (C8), the state machine 11 transitions to the START state, and the control signal generation circuit 15 starts asserting the signals XCS# and XRS#. In this cycle, the control signal generation circuit 15 asserts the signal XADV#. The wait counter 13 receives the number of waits that is set in the wait setting register 12.

The wait counter 13 starts down-counting as soon as the state machine 11 transitions to the following cycle (C9). As many wait cycles (C9, C10) as the number of waits in the wait setting register 12 are inserted.

The state machine 11 transitions to the END state in the following cycle (C11). In this cycle, the control signal generation circuit 15 asserts the signal CSHXVLD in order to notify the bus controller 300' that the data output onto XDB[0:15] is valid. The following operation is the same as described above.

Note that, in the case where the bus controller 300' designates the Non-Wrap mode, the operation is the same except that XAB is updated like "2→3→4" in the timing chart of FIG. 13.

As has been described above, according to the memory controller 10a of the present embodiment, the single access mode operation is repeatedly conducted in the case where the bus controller 300' designates an addressing mode or a burst length that is not supported by the external memory device 100, that is, in the case where the bits AMOD and BLEN in the device information setting register 16 do not match the signals EIHWRAP and EIHBCNT[0:2] from the bus controller 300'. This enables the correct data to be read from the external memory device 100.

In this case, an address corresponding to the Wrap mode or the Non-wrap mode is generated for output to the external memory device 100, making it possible to accurately read the data at a desired address.

Second Embodiment

Figure 14:
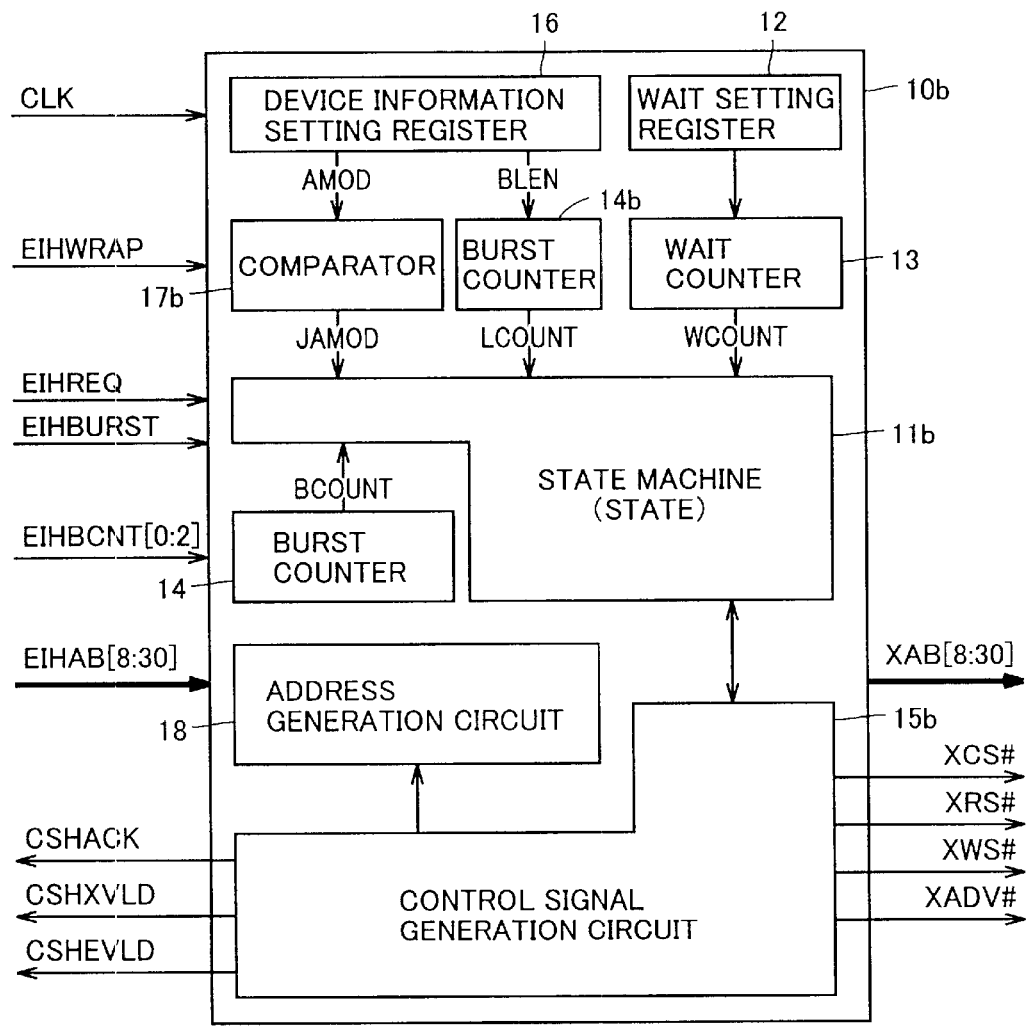
FIG. 14 is a block diagram schematically showing the structure of a memory controller 10b according to a second embodiment of the present invention.

FIG. 14 is a block diagram schematically showing the structure of a memory controller 10b according to the second embodiment of the present invention. Note that the memory controller 10b of FIG. 14 operates with the external memory device 100 of FIG. 1 and the bus controller of FIG. 2 being connected thereto. The bus controller of the present embodiment is different from that of FIG. 2 in that a signal EIHWRAP indicating the type of addressing mode (Wrap mode/Non-Wrap mode) is added, and that the bus controller of the present embodiment outputs the type of addressing mode at the same timing as that of the signals EIHREQ and EIHBURST. Accordingly, the bus controller of the present embodiment is denoted with "300b", and regarding the same structure and function, detailed description will not be repeated.

The memory controller 10b includes a state machine 11b for causing state transition according to the operation mode of the external memory device 100, a wait setting register 12 in which is set the number of waits in accessing the external memory device 100 by a not-shown microprocessor or the like, a wait counter 13 for counting the number of waits that is set in the wait setting register 12, burst counters 14 and 14b for counting the number of accesses in the burst access mode, a control signal generation circuit 15b for generating a control signal for controlling the external memory device 100 and the bus controller 300b according to the state of the state machine 11b, a device information setting register 16 in which information on the external memory device 100 is set, a comparator 17b for comparing the information that is set in the device information setting register 16 with a signal that is output from the bus controller 300b, and an address generation circuit 18 for generating an address to be output to the external memory device 100. Note that the portions having the same structure and function as those of the memory controller 10a of the first embodiment shown in FIG. 7 are denoted with the same reference numerals and characters, and detailed description thereof will not be repeated.

When a burst access request is generated, the burst counter 14b receives as an initial value the value of the bit BLEN that is set in the device information setting register 16. The burst counter 14b counts the number of accesses in burst access, and outputs the count value as a signal LCOUNT. As described in the first embodiment, the burst counter 14 manages the number of accesses for a burst access request from the bus controller 300b, whereas the burst counter 14b manages the allowable number of burst accesses to the external memory device 100.

The comparator 17b compares the bit AMOD in the device information setting register 16 with the signal EIHWRAP from the bus controller 300b, and outputs the comparison result as a signal JAMOD.

(1) Determination of Operation Mode

If the signal EIHBURST is not asserted at the time the signal EIHREQ is asserted, the memory controller 10b determines that the request is a single access mode request, and executes access to the external memory device 100 in the single access mode.

When the signals EIHREQ and EIHBURST are both asserted simultaneously, the memory controller 10b determines that the request is a burst access mode request. The comparator 17b compares the bit AMOD in the device information setting register 16 with the signal EIHWRAP from the bus controller 300b. When the bit AMOD matches the signal EIHWRAP, the comparator 17b outputs "1" as the signal JAMOD. Otherwise, the comparator 17b outputs "0" as the signal JAMOD.

When the signal JAMOD is "0" in the case of the burst access request, this means that the access request in an addressing mode that is not supported by the external memory device 100 is output from the bus controller 300b. Therefore, a plurality of burst access operations are conducted as described below in order to deal with the access request from the bus controller 300b.

(2) Single Access Mode Operation

Figure 3:
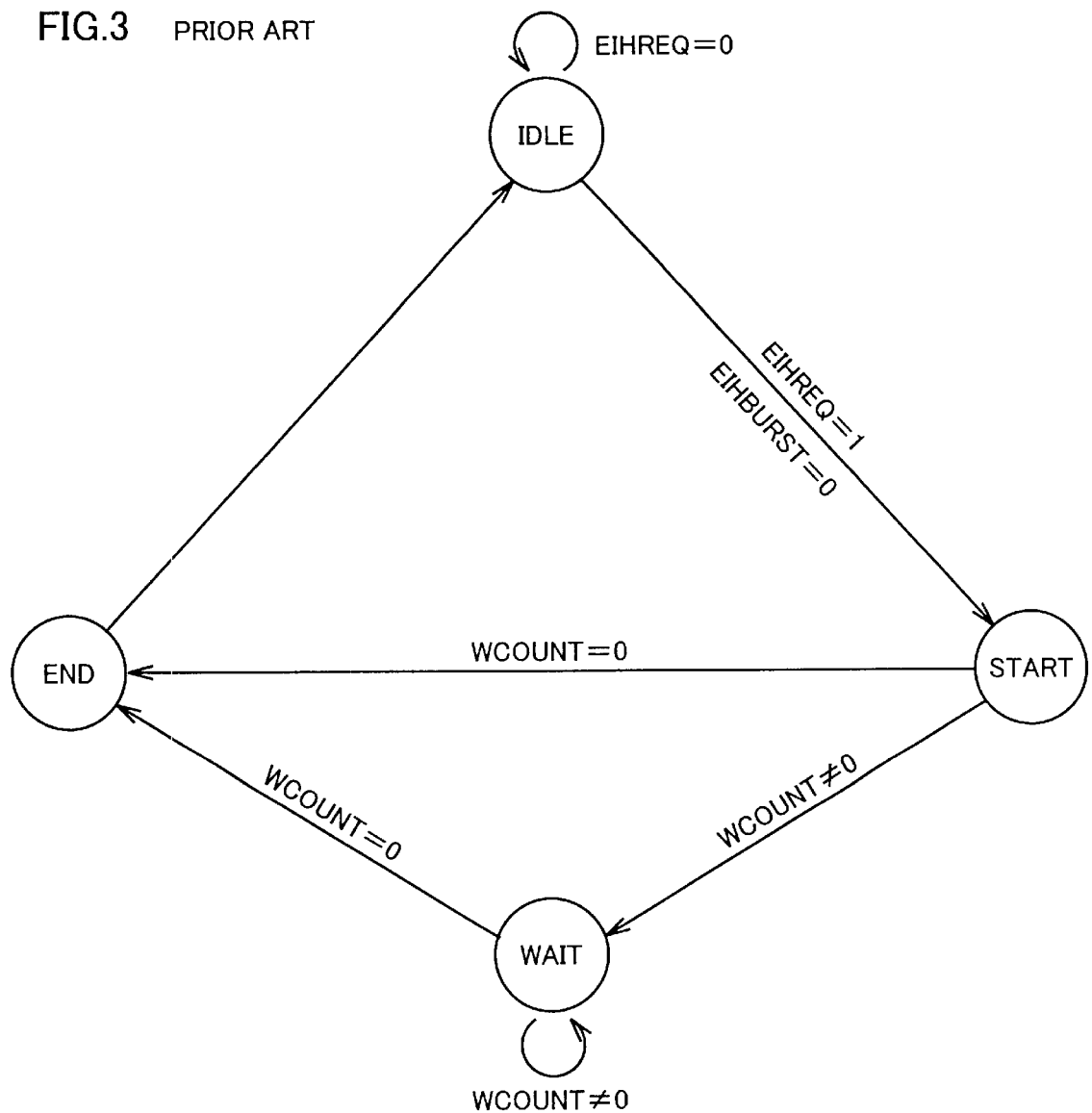
FIG. 3 is a diagram showing the state transition of the memory controller 200 in the single access mode.
Figure 4:
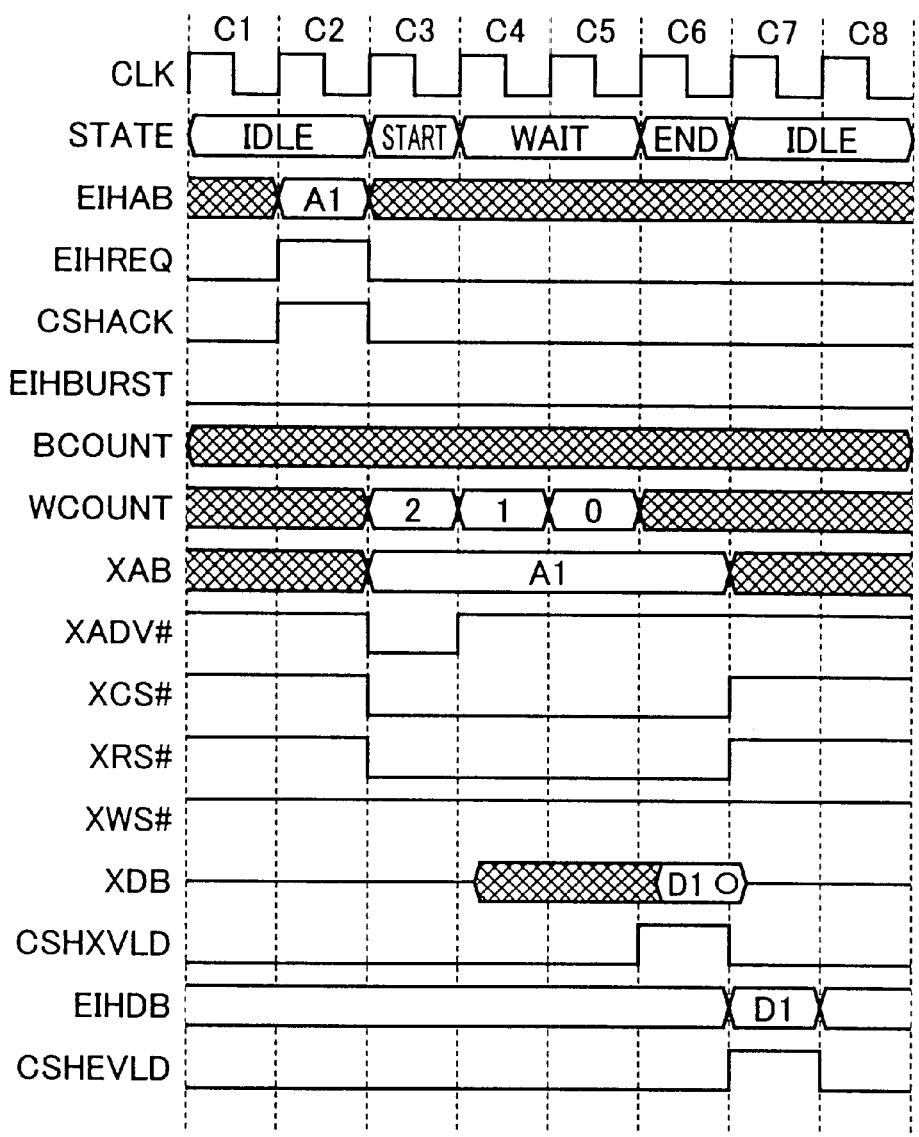
FIG. 4 is a timing chart illustrating the operation of the memory controller 200 in the single access mode.

The state transition diagram and timing chart of the memory controller 10b in the single access mode are the same as those of the conventional memory controller 200 in the single access mode shown in FIGS. 3 and 4. Therefore, detailed description thereof will not be repeated.

(3) Burst Access Mode Operation (Wrap Mode)

Figure 5:
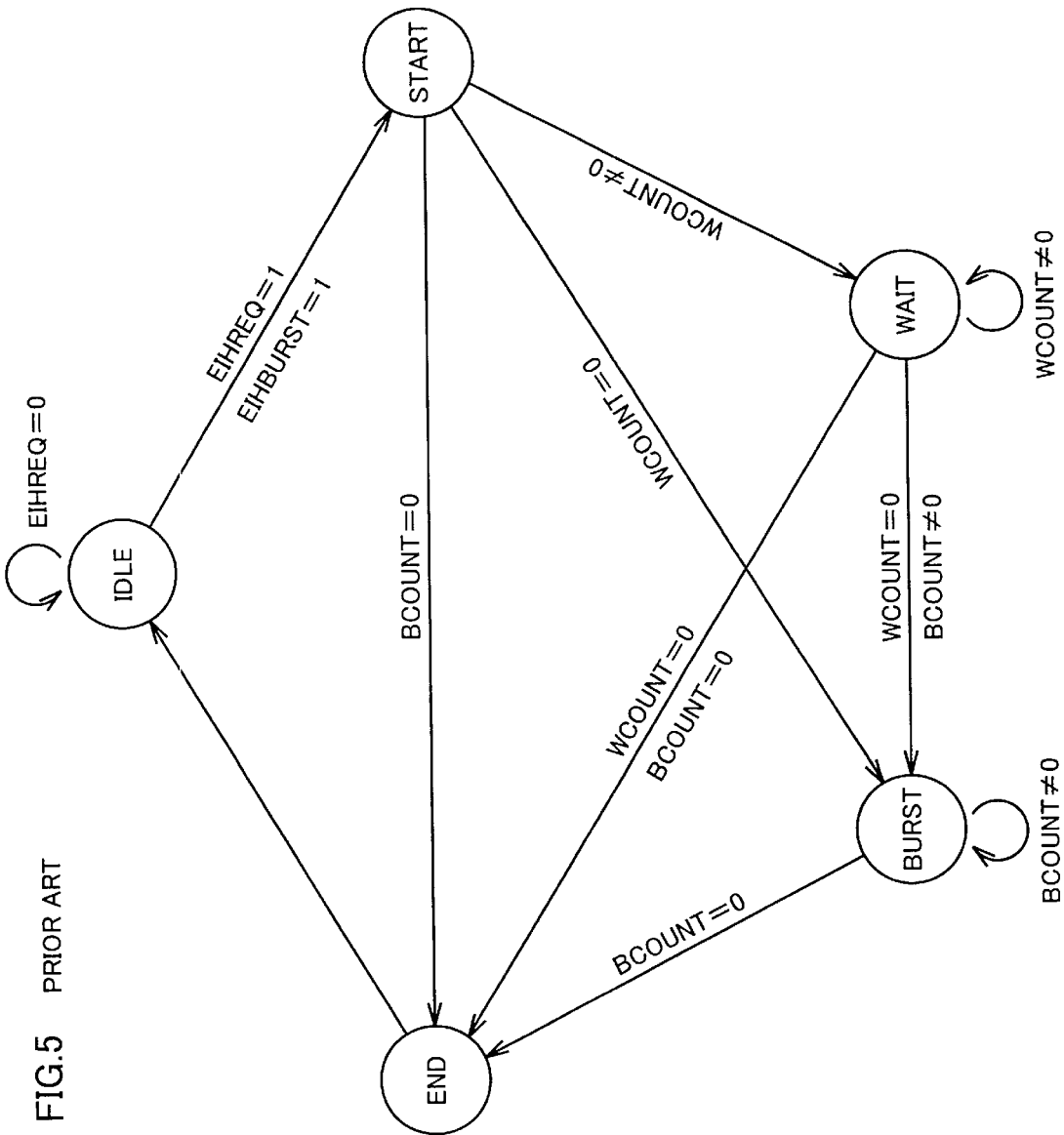
FIG. 5 is a diagram showing the state transition of the memory controller 200 in the burst access mode.
Figure 6:
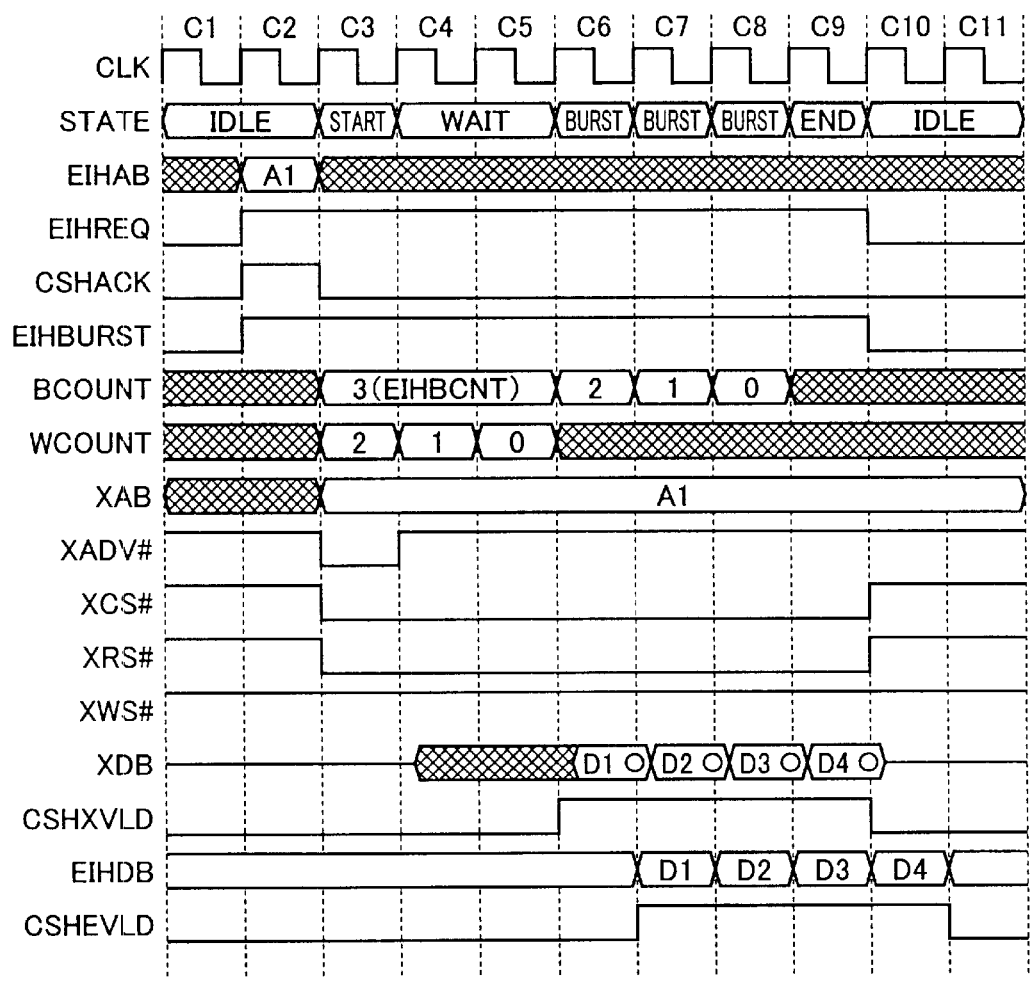
FIG. 6 is a timing chart illustrating the operation of the memory controller 200 in the burst access mode.

When the access request from the bus controller 300b corresponds to the Wrap mode (EIHWRAP=1) and the addressing mode of the external memory device 100 that is set in the device information setting register 16 is the Wrap mode (AMOD=1), state transition occurs according to the state transition diagram of the conventional memory controller 200 in the burst access shown in FIG. 5.

Figure 15:
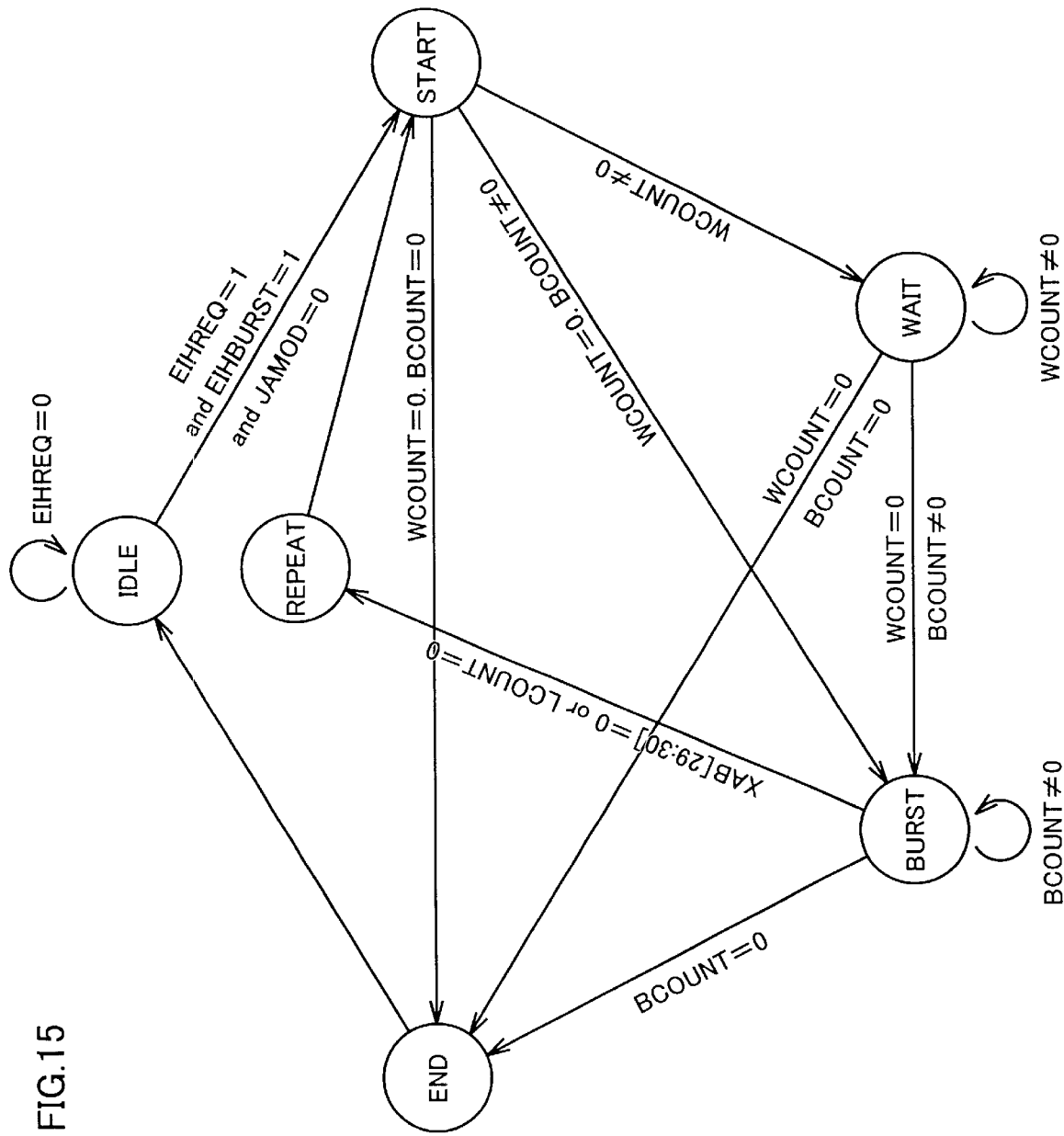
FIG. 15 is a diagram showing the state transition of the memory controller 10b in the case where an access request from a bus controller 300b corresponds to the Wrap mode and a signal JAMOD is "0".

FIG. 15 is a diagram showing the state transition of the memory controller 10b in the case where the access request from the bus controller 300b corresponds to the Wrap mode and the signal JAMOD is "0". When the signals EIHREQ and EIHBURST are both asserted as well as the signal JAMOD is "0" in the IDLE state, the state machine 11b transitions to the START state. The START state corresponds to a cycle in which assertion of the signal XCS# is started. One cycle of the START state is always inserted for every burst access request.

If the count value WCOUNT of the wait counter 13 is not "0" (WCOUNT≠0), the state machine 11b transitions to the WAIT state in the following cycle. The WAIT state is repeated until WCOUNT becomes "0". In other words, as many access waits as the number of waits in the wait setting register 12 are inserted.

When WCOUNT and BCOUNT are "0" (WCOUNT=0, BCOUNT=0) in the START state, the state machine 11b transitions to the END state in the following cycle.

When WCOUNT is "0" and BCOUNT is not "0" (WCOUNT=0, BCOUNT≠0) in the START state, or when WCOUNT is "0" and BCOUNT is not "0" (WCOUNT=0, BCOUNT≠0) in the WAIT state, the state machine 11b transitions to the BURST state in the following cycle.

The BURST state is repeated until one of the following conditions is satisfied: BCOUNT becomes "0"; XAB[29:30] becomes "0"; or LCOUNT from the burst counter 14b becomes "0". In the BURST state, successive addresses of the external memory device 100 are accessed in synchronization with the signal CLK. When BCOUNT becomes "0", the state machine 11b transitions to the END state in the following cycle. When XAB[29:30] becomes "0" or LCOUNT becomes "0", the state machine 11b transitions to the REPEAT state in the following cycle.

When the state machine 11b transitions to the REPEAT state, access to the external memory device 100 is discontinued. The state machine 11b then transitions back to the START state in the following cycle, and starts the remaining burst access.

When WCOUNT and BCOUNT are "0" (WCOUNT=0, BCOUNT=0) in the WAIT state, or when BCOUNT is "0" (BCOUNT=0) in the BURST state, the state machine 11b transitions to the END state. The END state is a cycle in which bus access is terminated. One cycle of the END state is always inserted at the end of the bus access. The burst access to the external memory device 100 is thus completed. The state machine 11b transitions to the IDLE state in the following cycle. The IDLE state is repeated until another access request is output from the bus controller 300b.

Figure 16:
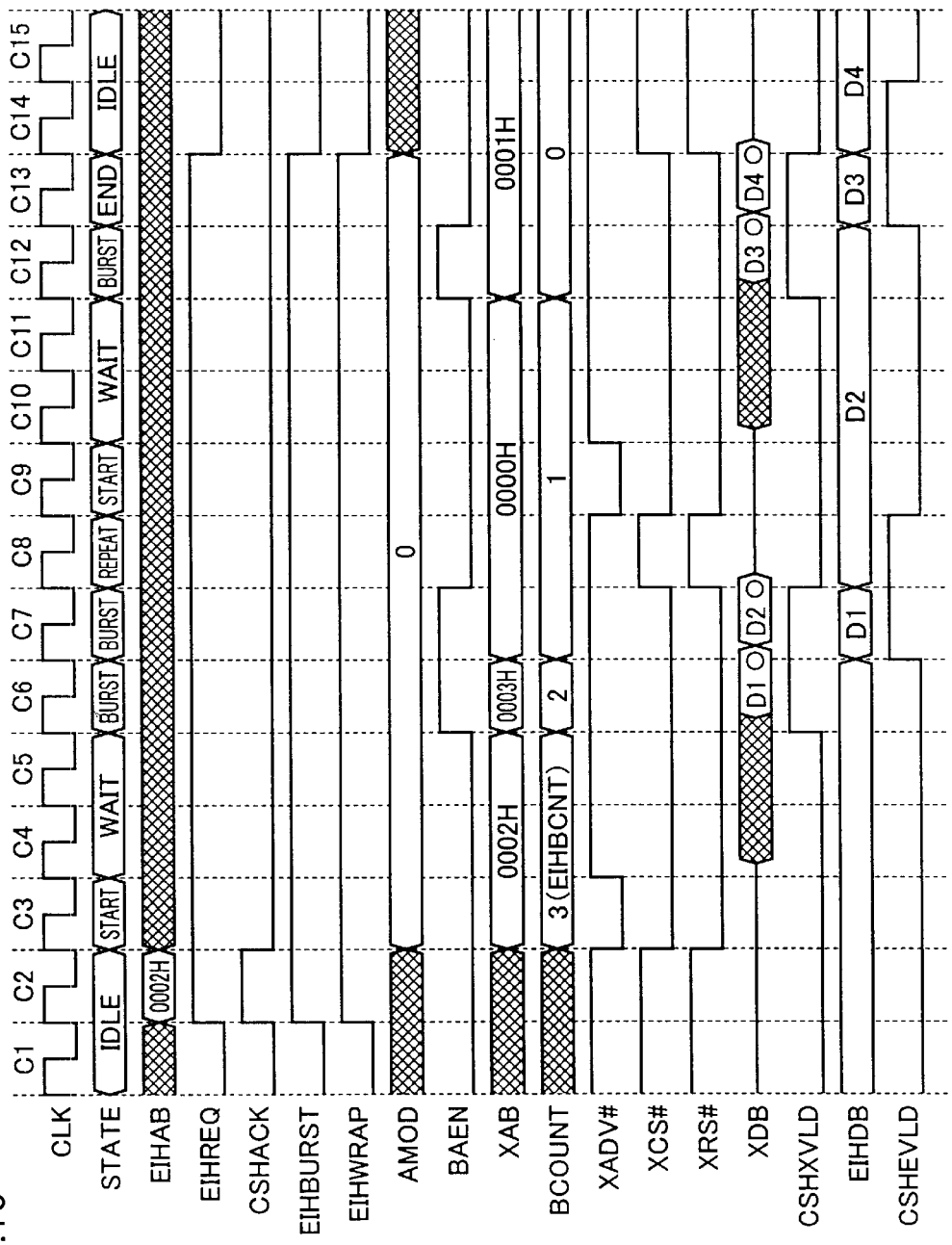
FIG. 16 is a timing chart illustrating the operation of the memory controller 10b in the case where the access request from the bus controller 300b corresponds to the Wrap mode and the signal JAMOD is "0".

FIG. 16 is a timing chart illustrating the operation of the memory controller 10b in the case where the access request from the bus controller 300b corresponds to the Wrap mode and the signal JAMOD is "0". This timing chart indicates a read operation, wherein the number of access waits is two cycles, the lower address at the start of burst access is "2", and the burst length is four words.

It is now assumed that the bus controller 300b asserts the signals EIHREQ and EIHBURST simultaneously while the state machine 11b is in the IDLE state (C2). If the signal JAMOD is "0" and the signal EIHWRAP is "1" at this time, the Non-Wrap mode access operation for the Wrap mode burst access request is started. The control signal generation circuit 15b asserts the signal CSHACK in this cycle in order to notify the bus controller 300b of acknowledge of the access request. In the case of the Wrap mode burst access request, the signals EIHREQ and EIHBURST are kept asserted until the Non-Wrap mode access operation for the Wrap mode burst access request is completed.

The state machine 11b then transitions to the START state (C3), and the control signal generation circuit 15b responsively starts asserting the signals XCS# and XRS#. In this cycle, the address generation circuit 18 receives an address that is output onto EIHAB[8:28], and outputs that address onto XAB[8:28]. The address generation circuit 18 also outputs the count value of the address counter A 22 onto XAB[29:30], and the control signal generation circuit 15b asserts the signal XADV#. The wait counter 13 receives the number of waits that is set in the wait setting register 12. The burst counter 14 receives the burst length "3" of the signal EIHBCNT[0:2]. In this cycle, the value "2" on EIHAB[29:30] is set to the address counter A 22, and "2" is output onto XAB[8:30].

The wait counter 13 starts down-counting as soon as the state machine 11b transitions to the WAIT state in the following cycle (C4). As many wait cycles (C4, C5) as the number of waits in the wait setting register 12 are inserted.

As soon as the state machine 11b transitions to the BURST state in the following cycle (C6), the signal BAEN is asserted, whereby the burst counter 14 starts down-counting and the address counter A 22 starts up-counting. The count value of the address counter A 22 is updated to "3", and "3" is output onto XAB[29:30]. In this cycle, the control signal generation circuit 15b asserts the signal CSHXVLD in order to notify the bus controller 300b that the data output onto XDB[0:15] is valid.

In response to the notification from the memory controller 10b, the bus controller 300b receives the data on XDB[0:15] in the following cycle (C7) for output onto EIHDB[0:15]. In this cycle, the address generation circuit 18 outputs "0" onto XAB[29:30], and the control signal generation circuit 15b asserts the signal CSHEVLD in order to notify the bus controller 300b that the data output onto EIHDB[0:15] is valid.

The state machine 11b transitions to the REPEAT state in the following cycle (C8). In this cycle, the control signal generation circuit 15b negates the signals XCS# and XRS#. In this cycle, the signal BAEN is also negated, whereby the burst counter 14 discontinues down-counting.

The state machine 11b transitions back to the START state in the following cycle (C9), and the control signal generation circuit 15b responsively starts asserting the signals XCS# and XRS#, and also asserts the signal XADV#. The wait counter 13 again receives the number of waits that is set in the wait setting register 12. In this cycle, the control signal generation circuit 15b negates the signal CSHEVLD.

The wait counter 13 starts down-counting as soon as the state machine 11b transitions to the WAIT state in the following cycle (C10). As many wait cycles (C10, C11) as the number of waits in the wait setting register 12 are inserted.

As soon as the state machine 11b transitions to the BURST state in the following cycle (C12), the burst counter 14 resumes down-counting and the address counter A 22 resumes up-counting. The count value of the address counter A 22 is updated to "1", and "1" is output onto XAB[29:30]. In this cycle, the control signal generation circuit 15b asserts the signal CSHXVLD in order to notify the bus controller 300b that the data output onto XDB[0:15] is valid.

In response to the notification from the memory controller 10b, the bus controller 300b receives the data on the XDB[0:15] in the following cycle (C13) for output onto EIHDB[0:15]. In this cycle, the control signal generation circuit 15b asserts the signal CSHEVLD in order to notify the bus controller 300b that the data output onto EIHDB [0:15] is valid.

The state machine 11b transitions to the IDLE state in the following cycle (C14). In this cycle, the control signal generation circuit 15b negates the signals XCS# and XRS#, thereby completing the Non-Wrap mode access operation for the Wrap mode burst access request.

(4) Burst Access Mode Operation (Non-Wrap Mode)

When the access request from the bus controller 300b corresponds to the Non-Wrap mode (EIHWRAP=0) and the addressing mode of the external memory device 100 that is set in the device information setting register 16 is the Non-Wrap mode (AMOD=0), state transition occurs according to the state transition diagram of the conventional memory controller 200 in the burst access shown in FIG. 5.

In the case where the access request from the bus controller 300b corresponds to the Non-Wrap mode and the signal JAMOD is "0", state transition of the memory controller 10b occurs in the same manner as that in the state transition diagram of FIG. 15. Therefore, detailed description thereof will not be repeated.

Figure 17:
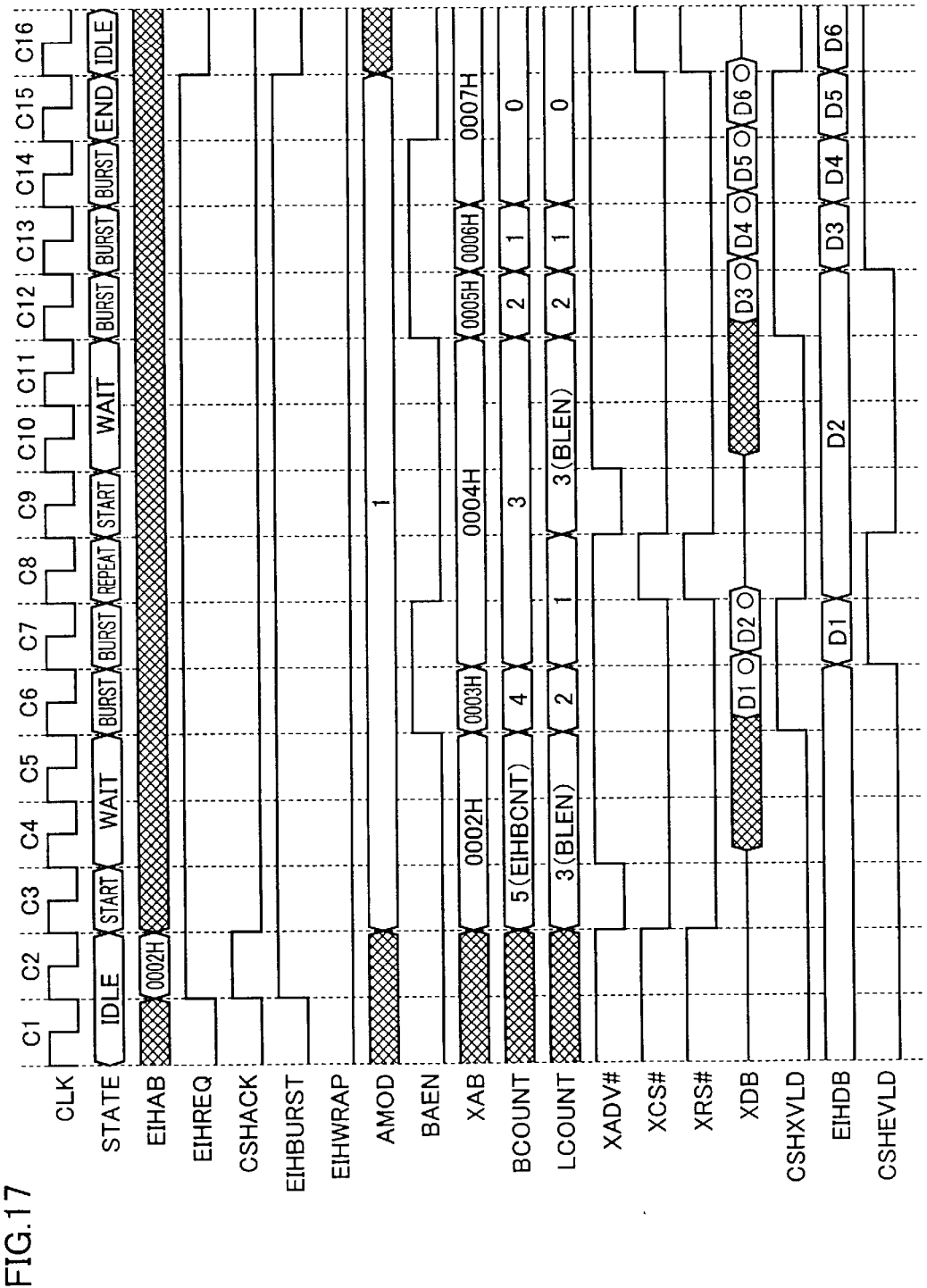
FIG. 17 is a timing chart illustrating the operation of the memory controller 10b in the case where the access request from the bus controller 300b corresponds to the Non-Wrap mode and the signal JAMOD is "0".

FIG. 17 is a timing chart illustrating the operation of the memory controller 10b in the case where the access request from the bus controller 300b corresponds to the Non-Wrap mode and the signal JAMOD is "0". This timing chart indicates a read operation, wherein the number of access waits is two cycles, the lower address at the start of burst access is "2", and the burst length is six words.

It is now assumed that the bus controller 300b asserts the signals EIHREQ and EIHBURST simultaneously while the state machine 11b is in the IDLE state (C2). If the signal JAMOD is "0" and the signal EIHWRAP is "0" at this time, the state machine 11b starts the Wrap mode access operation for the Non-Wrap mode burst access request. The control signal generation circuit 15b asserts the signal CSHACK in this cycle in order to notify the bus controller 300b of acknowledgement of the access request. The signals EIHREQ and EIHBURST are kept asserted until the Wrap mode access operation for the Non-Wrap mode burst access request is completed.

The state machine 11b then transitions to the START state (C3), and the control signal generation circuit 15b responsively starts asserting the signals XCS# and XRS#. In this cycle, the address generation circuit 18 receives an address that is output onto EIHAB[8:30]. The address generation circuit 18 also outputs the count value "2" of the address counter B 23 onto XAB[8:30], and the control signal generation circuit 15b asserts the signal XADV#. The wait counter 13 receives the number of waits that is set in the wait setting register 12. The burst counter 14 receives the burst length "5" of the signal EIHBCNT[0:2]. The burst counter 14b receives the bit BLEN that is set in the device information setting register 16.

The wait counter 13 starts down-counting as soon as the state machine 11b transitions to the WAIT state in the following cycle (C4). As many wait cycles (C4, C5) as the number of waits in the wait setting register 12 are inserted.

As soon as the state machine 11b transitions to the BURST state in the following cycle (C6), the burst counter 14 starts down-counting and the address counter B 23 starts up-counting. The count value of the address counter B 23 is updated to "3", and "3" is output onto XAB[8:30]. In this cycle, the control signal generation circuit 15b asserts the signal CSHXVLD in order to notify the bus controller 300b that the data output onto XDB[0:15] is valid.

In response to the notification from the memory controller 10b, the bus controller 300b receives the data on XDB[0:15] in the following cycle (C7) for output onto EIHDB[0:15]. In this cycle, the address generation circuit 18 outputs "4" onto XAB[8:30], and the control signal generation circuit 15b asserts the signal CSHEVLD in order to notify the bus controller 300b that the data output onto EIHDB[0:15] is valid.

The state machine 11b transitions to the REPEAT state in the following cycle (C8). In this cycle, the control signal generation circuit 15b negates the signals XCS# and XRS#. In this cycle, the signal BAEN is also negated, whereby the burst counter 14 discontinues down-counting.

The state machine 11b transitions back to the START state in the following cycle (C9), and the control signal generation circuit 15b responsively starts asserting the signals XCS# and XRS#, and also asserts the signal XADV#. The wait counter 13 again receives the number of waits that is set in the wait setting register 12. The burst counter 14b again receives the bit BLEN, "3", that is set in the device information setting register 16. In this cycle, the control signal generation circuit 15b negates the signal CSHEVLD.

The wait counter 13 starts down-counting as soon as the state machine 11b transitions to the WAIT state in the following cycle (C10). As many wait cycles (C10, C11) as the number of waits in the wait setting register 12 are inserted.

As soon as the state machine 11b transitions to the BURST state in the following cycle (C12), the burst counter 14 resumes down-counting and the address counter B 23 resumes up-counting. The count value of the address counter B 23 is updated to "5", and "5" is output onto XAB[29:30]. In this cycle, the control signal generation circuit 15b asserts the signal CSHXVLD in order to notify the bus controller 300b that the data output onto XDB[0:15] is valid.

In response to the notification from the memory controller 10b, the bus controller 300b receives the data on the XDB[0:15] in the following cycle (C13) for output onto EIHDB[0:15]. In this cycle, the control signal generation circuit 15b asserts the signal CSHEVLD in order to notify the bus controller 300b that the data output onto EIHDB [0:15] is valid.

The state machine 11b is kept in the BURST state in the following cycle (C14). In this cycle, the count value of the address counter B 23 is updated to "7", and "7" is output onto XAB[29:30].

The state machine 11b transitions to the END state in the following cycle (C15). At this time, the signal BAEN is negated.

In the following cycle (C16), the state machine 11b transitions back to the IDLE state, and the control signal generation circuit 15b negates the signals XCS# and XRS#. Thus, the Wrap mode burst access operation to the external memory device 100 is completed.

As has been described above, according to the memory controller 10b of the present embodiment, a plurality of burst access mode operations are conducted in the case where the bus controller 300b designates an addressing mode or a burst length that is not supported by the external memory device 100. This enables the correct data to be read from the external memory device 100.

In this case, an address corresponding to the Wrap mode or the Non-wrap mode is generated for output to the external memory device 100, making it possible to accurately read the data at a desired address.

Third Embodiment

Figure 18:
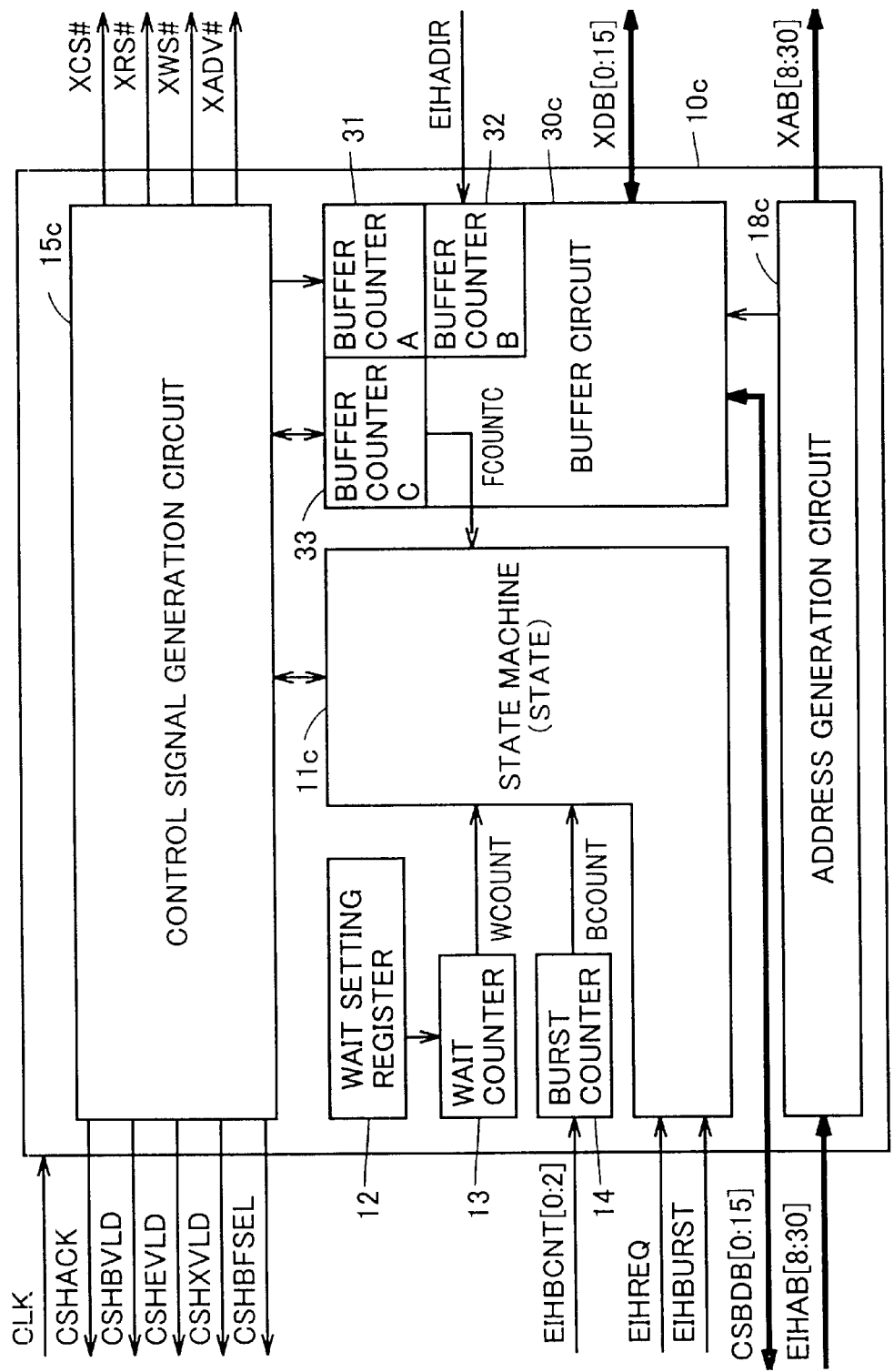
FIG. 18 is a block diagram schematically showing the structure of a memory controller 10c according to a third embodiment of the present invention.

FIG. 18 is a block diagram schematically showing the structure of a memory controller 10c according to the third embodiment of the present invention. Note that the memory controller 10c of FIG. 18 operates with the external memory device 100 of FIG. 1 and the bus controller of FIG. 2 being connected thereto. The bus controller of the present embodiment is different from that of FIG. 2 in that the following elements are added: a signal EIHADIR indicating the type of addressing mode (positive direction/negative direction); a signal CSHBFSEL for notifying the bus controller of the state of access to a buffer described below; CSBDB[0:15] on which the data in the buffer is output; and a signal CSHB-VLD for notifying the bus controller that the data output onto CSBDB[0:15] is valid. Accordingly, the bus controller of the present embodiment is denoted with "300c", and regarding the same structure and function, detailed description will not be repeated.

The memory controller 10b includes a state machine 11b for causing state transition according to the operation mode of the external memory device 100, a wait setting register 12 in which is set the number of waits in accessing the external memory device 100 by a not-shown microprocessor or the like, a wait counter 13 for counting the number of waits that is set in the wait setting register 12, a burst counter 14 for counting the number of accesses in the burst access mode, a control signal generation circuit 15c for generating a control signal for controlling the external memory device 100 and the bus controller 300c according to the state of the state machine 11c, an address generation circuit 18c for generating an address to be output to the external memory device 100, and a buffer circuit 30c for temporarily storing the data from the external memory device 100. Note that the portions having the same structure and function as those of the memory controller 10a of the first embodiment shown in FIG. 7 are denoted with the same reference numerals and characters, and detailed description thereof will not be repeated.

The address generation circuit 18c sets the lower two bits of EIHAB[8:30] output from the bus controller 300c to "0" for output onto XAB[8:30].

Figure 19:
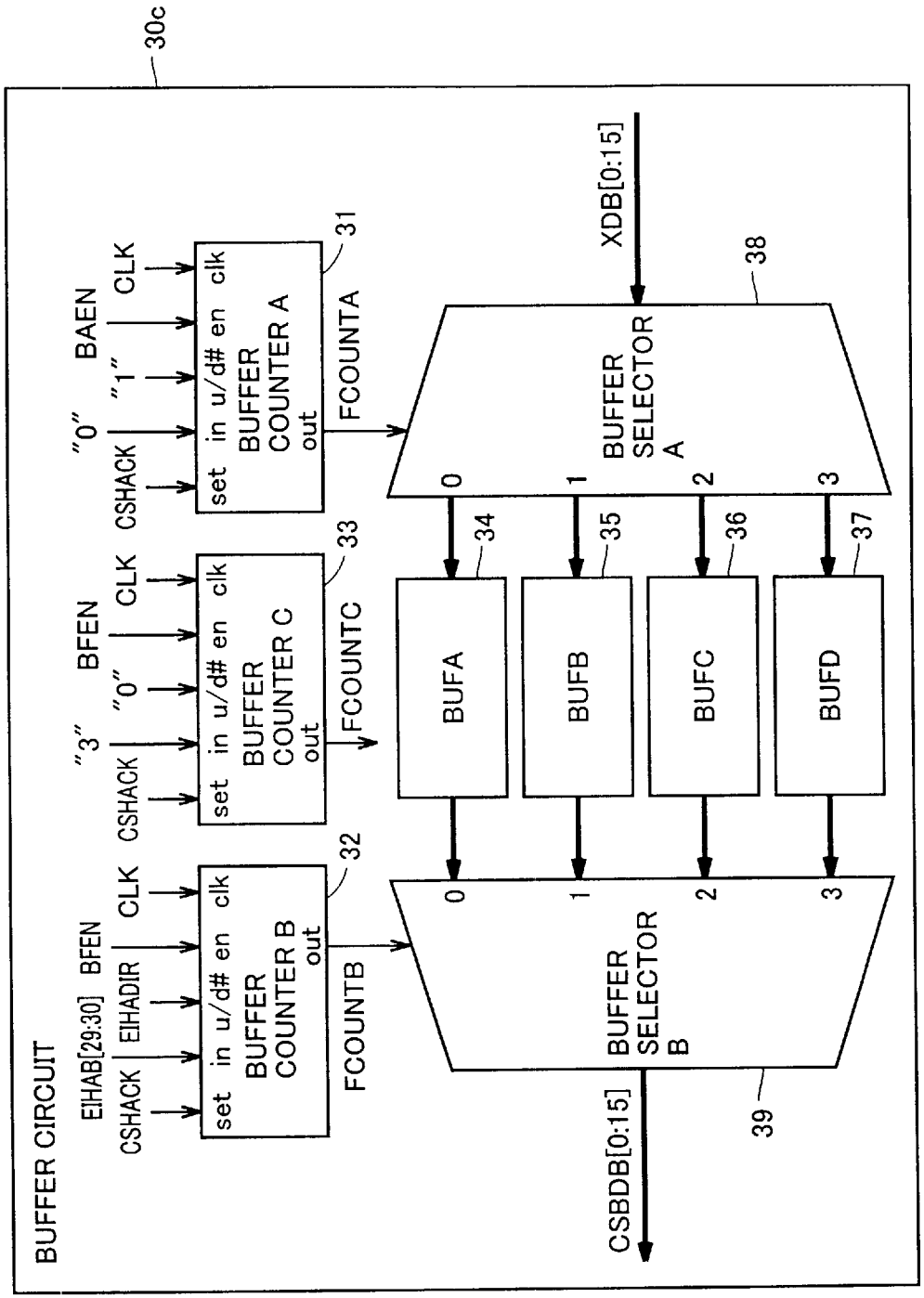
FIG. 19 is a block diagram schematically showing the structure of a buffer circuit 30c.

FIG. 19 is a block diagram schematically showing the structure of the buffer circuit 30c. The buffer circuit 30c includes BUFA 34, BUFB 35, BUFC 36 and BUFD 37 for storing the data read from the external memory device 100, a buffer counter A 31 for controlling buffer selection for storing the data read from the external memory device 100, a buffer counter B 32 for controlling buffer selection for outputting the data stored in the buffer to the bus controller 300c, a buffer counter C 33 for counting the data output to the bus controller 300c, a buffer selector A 38 for selecting a buffer for storing the data read from the external memory device 100, and a buffer selector B 39 for selecting a buffer for outputting the data to the bus controller 300c.

The buffer counter A 31 receives the value "0" in synchronization with the signal CLK when the signal CSHACK is asserted, and conducts up-counting in synchronization with the signal CLK while the signal BAEN is kept asserted.

The buffer counter B 32 receives the value of EIHAB [29:30] in synchronization with the signal CLK when the signal CSHACK is asserted. While the signal BFEN is kept asserted, the buffer counter B 32 conducts counting in synchronization with the signal CLK according to the signal EIHADIR. More specifically, when the signal EIHADIR is "1", the buffer counter B 32 conducts up-counting to count an address in the positive direction. When the signal EIHA-DIR is "0", the buffer counter B 32 conducts down-counting to count an address in the negative direction.

The buffer counter C 33 receives the value "3" in synchronization with the signal CLK when the signal CSHACK is asserted, and conducts down-counting in synchronization with the signal CLK while the signal BFEN is kept asserted.

(1) Determination of Operation Mode

If the signal EIHBURST is not asserted at the time the signal EIHREQ is asserted, the memory controller 10c determines that the request is a single access mode request, and executes access to the external memory device 100 in the single access mode. When the signals EIHREQ and EIHBURST are both asserted simultaneously, the memory controller 10c determines that the request is a burst access mode request.

(2) Single Access Mode Operation

The state transition diagram and timing chart of the memory controller 10c in the single access mode are the same as those of the conventional memory controller 200 in the single access mode shown in FIGS. 3 and 4. Therefore, detailed description thereof will not be repeated.

(3) Burst Access Mode Operation

Figure 20:
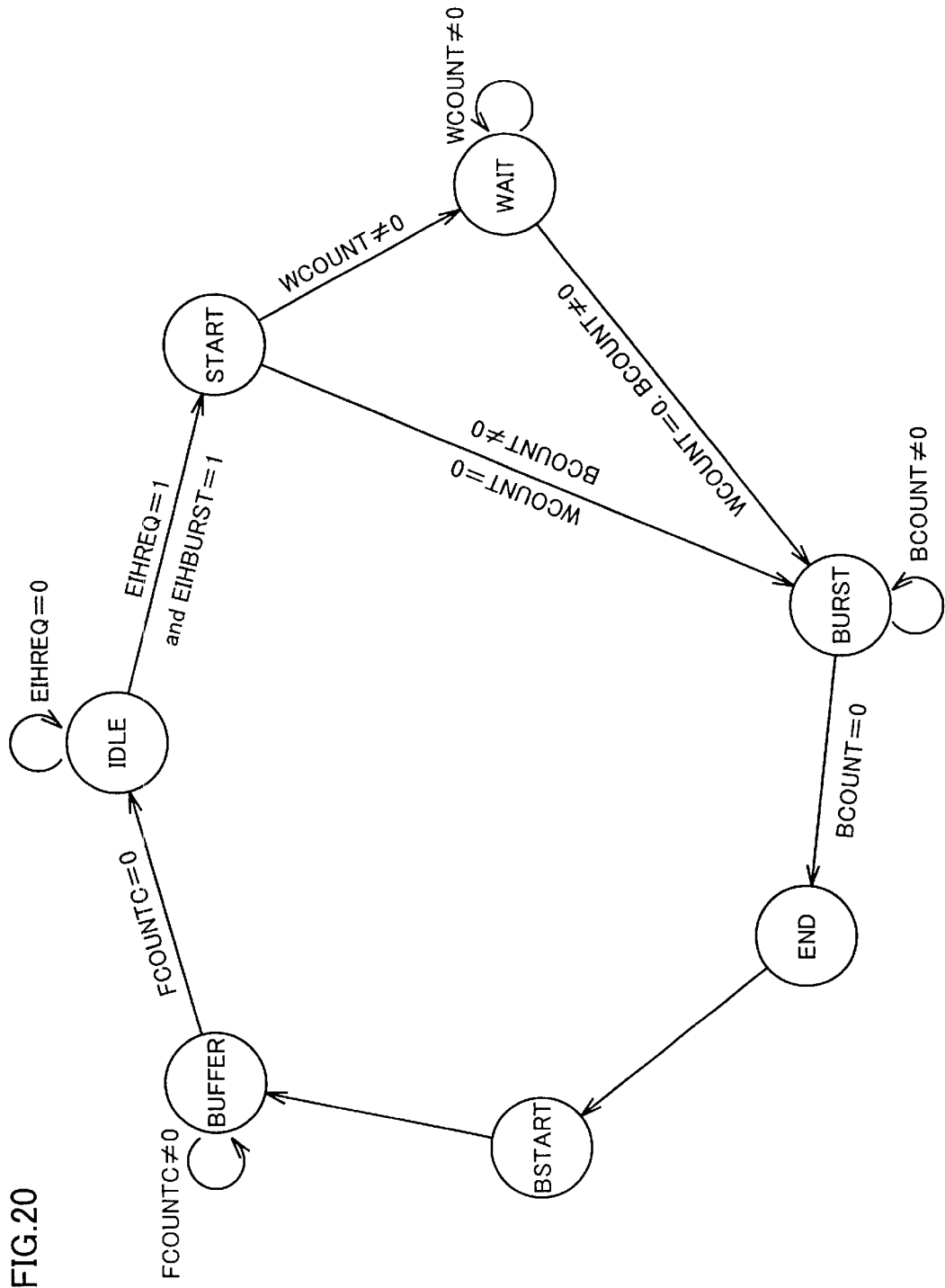
FIG. 20 is a diagram showing the state transition of the memory controller 10c in the case where a burst access request is output from a bus controller 300c.

FIG. 20 is a diagram showing the state transition of the memory controller 10c in the case where a burst access request is output from the bus controller 300c. When the signals EIHREQ and EIHBURST are both asserted in the IDLE state, the state machine 11c transitions to the START state. The START state corresponds to a cycle in which assertion of the signal XCS# is started. One cycle of the START state is always inserted for every burst access request.

If the count value WCOUNT of the wait counter 13 is not "0" (WCOUNT≠0), the state machine 11c transitions to the WAIT state in the following cycle. The WAIT state is repeated until WCOUNT becomes "0". In other words, as many access waits as the number of waits in the wait setting register 12 are inserted.

When WCOUNT is "0" and BCOUNT is not "0" (WCOUNT=0, BCOUNT≠0) in the START state, or when WCOUNT is "0" and BCOUNT is not "0" (WCOUNT=0, BCOUNT≠0) in the WAIT state, the state machine 11c transitions to the BURST state in the following cycle.

The BURST state is repeated until BCOUNT becomes "0". When BCOUNT becomes "0", the state machine 11c transitions to the END state in the following cycle. The END state is a cycle in which bus access is terminated. One cycle of the END state is always inserted at the end of the bus access. The burst access to the external memory device 100 is thus completed. The state machine 11c transitions to the BSTART state in the following cycle.

The BSTART state indicates a cycle in which access to the buffer is started. One cycle of the BSTART state is always inserted. The state machine 11c transitions to the BUFFER state in the following cycle. The BUFFER state is repeated until FCOUNTC output from the buffer counter C 33 becomes "0".

When FCOUNTC becomes "0" in the BUFFER state, the state machine 11c transitions to the IDLE state in the following cycle. The IDLE state is repeated until another access request is output from the bus controller 300c.

Figure 21:
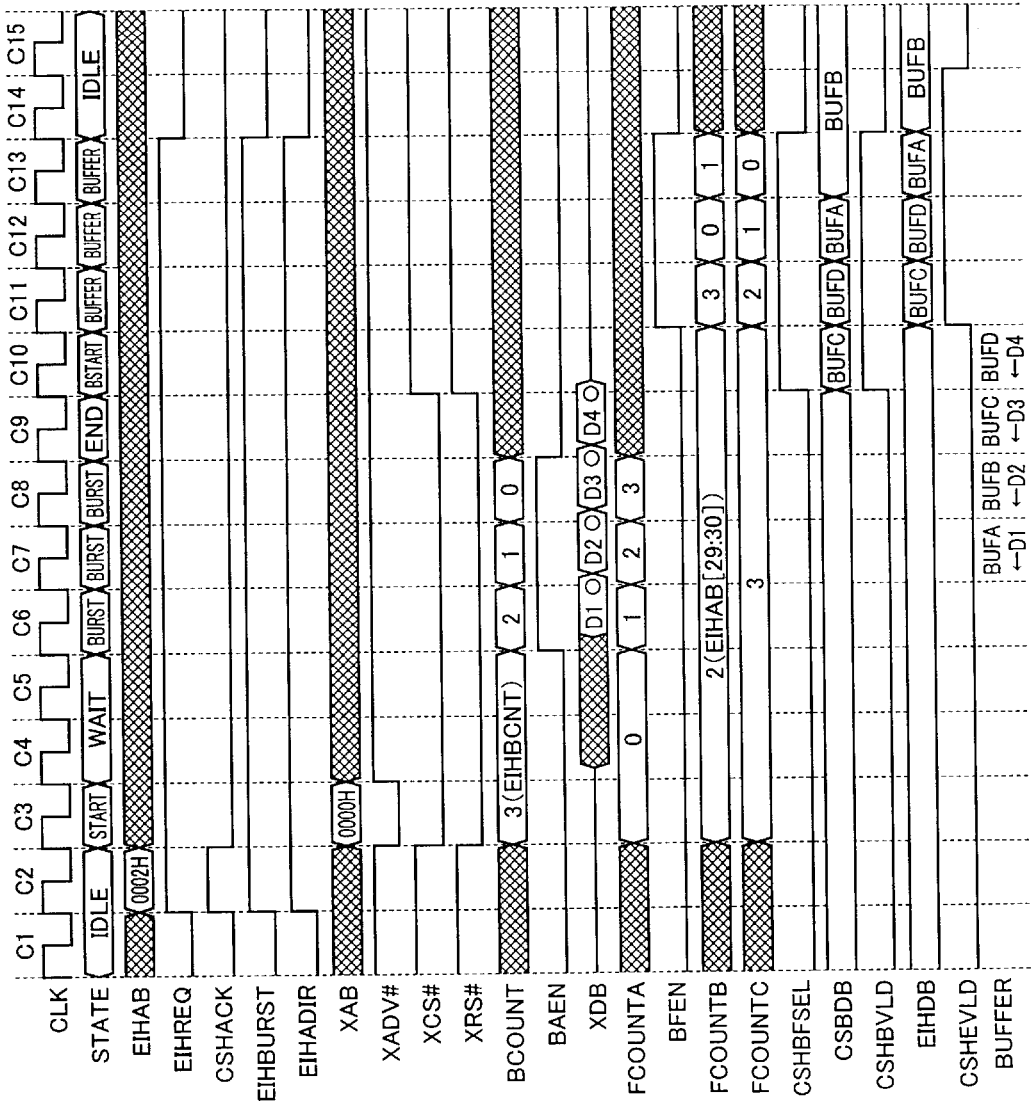
FIG. 21 is a timing chart illustrating the operation of the memory controller 10c in the case where a Wrap mode burst access request is output from the bus controller 300c.

FIG. 21 is a timing chart illustrating the operation of the memory controller 10c in the case where a Wrap mode burst access request is output from the bus controller 300c. This timing chart indicates a read operation, wherein the number of access waits is two cycles, the lower address at the start of burst access is "2", the burst length is four words, and the address direction is a positive direction.

If the bus controller 300c asserts the signals EIHREQ and EIHBURST simultaneously while the state machine 11c is in the IDLE state (C2), the state machine 11c determines that the request is a Wrap mode burst access request, and sets the operation mode to the Wrap mode. The control signal generation circuit 15c asserts the signal CSHACK in this cycle in order to notify the bus controller 300c of acknowledgement of the access request. In the case of the Wrap mode burst access request, the signals EIHREQ and EIHBURST are kept asserted until the Wrap mode burst access is completed.

The state machine 11c then transitions to the START state (C3), and the control signal generation circuit 15c responsively starts asserting the signals XCS# and XRS#. In this cycle, the address generation circuit 18c receives an address that is output onto EIHAB[8:28], and outputs that address onto XAB[8:28]. The address generation circuit 18c also outputs "0" onto XAB[29:30], and the control signal generation circuit 15c asserts the signal XADV#. The wait counter 13 receives the number of waits that is set in the wait setting register 12. The burst counter 14 receives the burst length "3" of the signal EIHBCNT[0:2]. In this cycle, the buffer counter A 31 receives the value "0". The buffer counter B 32 receives the value on EIHAB[29:30]. The buffer counter C 33 receives the value "3".

The wait counter 13 starts down-counting as soon as the state machine 11c transitions to the WAIT state in the following cycle (C4). As many wait cycles (C4, C5) as the number of waits in the wait setting register 12 are inserted.

As soon as the state machine 11c transitions to the BURST state in the following cycle (C6), the burst counter 14 starts down-counting. In this cycle, the signal BAEN is asserted, whereby the buffer counter A 31 starts up-counting.

In the cycles C7 to C9, the control signal generation circuit 15c retains the values of the signals XCS# and XRS#, thereby allowing the external memory device 100 to access to successive addresses. In the cycle C7, data D1 is stored in the BUFA 34. In the cycle C8, data D2 is stored in the BUFB 35. In the cycle C9, data D3 is stored in the BUFC 36. The state machine 11c transitions to the END state in the cycle C9.

The state machine 11c transitions to the BSTART state in the following cycle (C10). In this cycle, the control signal generation circuit 15c negates the signals XCS# and XRS#, thereby completing burst access to the external memory device 100. The control signal generation circuit 15c also negates the signal CSHXVLD. At this time, final data D4 is stored in the BUFD 37. The buffer selector B 39 selects the data stored in the BUFC 36 according to the signal FCOUNTB from the buffer counter B 32, and outputs the selected data onto CSBDB[0:15]. The signals CSHBFSEL and CSHBVLD are asserted in order to notify the bus controller 300c that the data output onto CSBDB[0:15] is valid.

The state machine 11c transitions to the BUFFER state in the following cycle (C11). In this cycle, the signal BFEN is asserted, whereby the buffer counter B 32 starts up-counting and the buffer counter C 33 starts down-counting.

In the cycles C11 to C13, the buffer selector B 39 sequentially selects the respective data stored in the BUFD 37, BUFA 34 and BUFB 35 in this order, and sequentially outputs the selected data onto CSBDB[0:15].

The state machine 11c transitions to the IDLE state in the following cycle (C14). In this cycle, the control signal generation circuit 15c negates the signals CSHBFSEL and CSHBVLD in order to notify the bus controller 300c of completion of the data read operation from the buffers.

As has been described above, according to the memory controller 10c of the present embodiment, even if the external memory device 100 supports only the Non-Wrap mode and a Wrap mode burst access request is output from the bus controller 300c, the data read from the external memory device 100 is first stored in the buffer circuit 30c, and then sequentially output to the bus controller 300c in the order corresponding to the Wrap mode. This enables the bus controller 300c to read the correct data from the external memory device 100.

Fourth Embodiment

The memory controller 10c of the third embodiment first stores in the buffer circuit 30c the data read from the external memory device 100 in the Non-Wrap mode, and then sequentially outputs the data onto CSBDB[0:15] in the order corresponding to the Wrap mode. The memory controller of the fourth embodiment of the present invention is characterized in that it conducts the following operation in the case where the lower two bits EIHAB[29:30] of the access starting address from the bus controller 300c matches the value FCOUNTA from the buffer counter A 31 while the data read from the external memory device 100 in the Non-Wrap mode is being stored in the buffer circuit 30c: the memory controller of the present embodiment notifies the bus controller 300c that the data output from the external memory device 100 onto XDB[0:15] without passing through the buffer circuit 30c is valid, and then outputs the data stored in the buffer circuit 30c to the bus controller 300c.

The memory controller of the fourth embodiment is different from that of the third embodiment of FIG. 18 in function of the state machine and the control signal generation circuit. Regarding the same structure and function, detailed description will not be repeated. Note that the memory controller, state machine and control signal generation circuit of the present embodiment are denoted with "10d", "11d" and "15d", respectively.

(1) Determination of Operation Mode

Determination of the operation mode of the memory controller 10d of the present embodiment is the same as that of the memory controller 10c of the third embodiment. Therefore, detailed description thereof will not be repeated.

(2) Single Access Mode Operation

The state transition diagram and timing chart of the memory controller 10d in the single access mode are the same as those of the conventional memory controller 200 in the single access mode shown in FIGS. 3 and 4. Therefore, detailed description thereof will not be repeated.

(3) Burst Access Mode Operation

Figure 22:
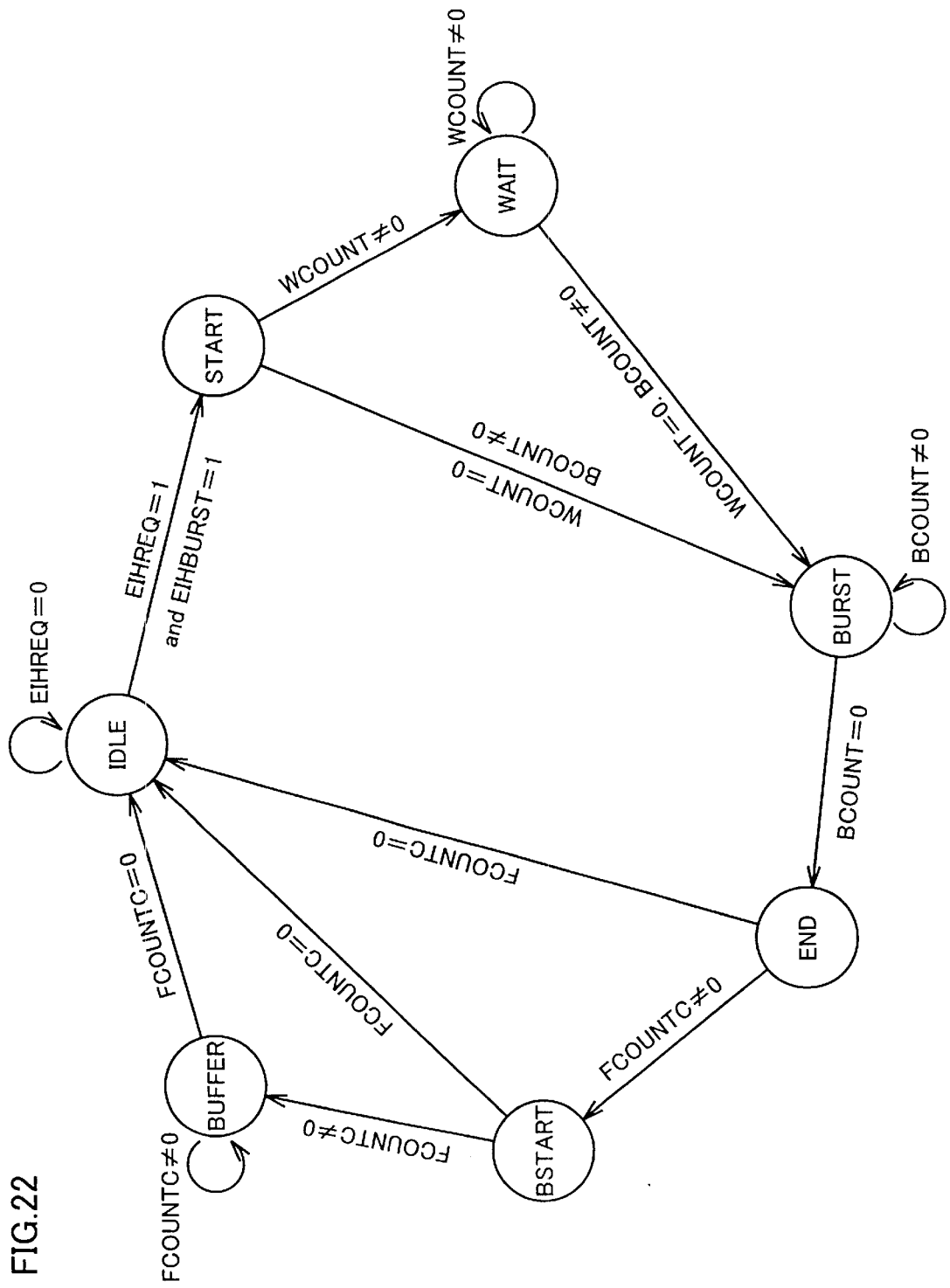
FIG. 22 is a diagram showing the state transition of a memory controller 10d in the case where a burst access request is output from the bus controller 300c.

FIG. 22 is a diagram showing the state transition of the memory controller 10d in the case where a burst access request is output from the bus controller 300c. When the signals EIHREQ and EIHBURST are both asserted in the IDLE state, the state machine lid transitions to the START state. The START state corresponds to a cycle in which assertion of the signal XCS# is started. One cycle of the START state is always inserted for every burst access request.

If the count value WCOUNT of the wait counter 13 is not "0" (WCOUNT≠0), the state machine lid transitions to the WAIT state in the following cycle. The WAIT state is repeated until WCOUNT becomes "0". In other words, as many access waits as the number of waits in the wait setting register 12 are inserted.

When WCOUNT is "0" and BCOUNT is not "0" (WCOUNT=0, BCOUNT≠0) in the START state, or when WCOUNT is "0" and BCOUNT is not "0" (WCOUNT=0, BCOUNT≠0) in the WAIT state, the state machine 11d transitions to the BURST state in the following cycle.

The BURST state is repeated until BCOUNT becomes "0". When BCOUNT becomes "0", the state machine 11d transitions to the END state in the following cycle. The END state is a cycle in which bus access is terminated. One cycle of the END state is always inserted at the end of the bus access. The burst access to the external memory device 100 is thus completed. When FCOUNTC from the buffer counter C33 is "0", the state machine 11d transitions to the IDLE state in the following cycle. When FCOUNTC is not "0", the state machine lid transitions to the BSTART state in the following cycle.

The BSTART state indicates a cycle in which access to the buffer is started. One cycle of the BSTART state is always inserted. When FCOUNTC is not "0", the state machine lid transitions to the BUFFER state in the following cycle. When FCOUNTC is "0", the state machine 11d transitions to the IDLE state in the following cycle.

In the case where the state machine 11d transitions to the BUFFER state, the BUFFER state is repeated until FCOUNTC from the buffer counter C 33 becomes "0".

When FCOUNTC becomes "0" in the BUFFER state, the state machine 11d transitions to the IDLE state in the following cycle. The IDLE state is repeated until another access request is output from the bus controller 300c.

Figure 23:
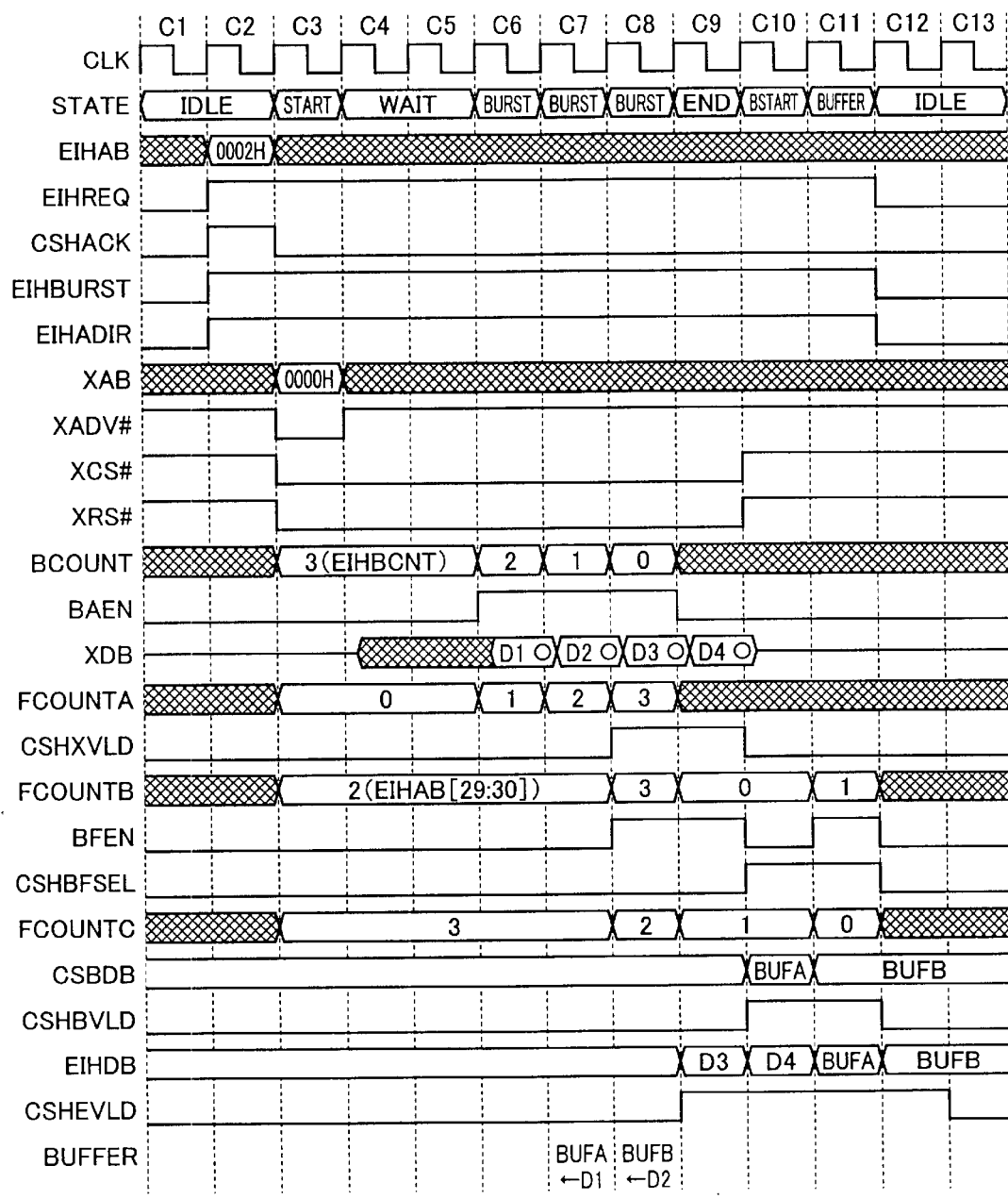
FIG. 23 is a timing chart illustrating the operation of the memory controller 10d in the case where a Wrap mode burst access request is output from the bus controller 300c.

FIG. 23 is a timing chart illustrating the operation of the memory controller 10d in the case where a Wrap mode burst access request is output from the bus controller 300c. This timing chart indicates a read operation, wherein the number of access waits is two cycles, the lower address at the start of burst access is "2", the burst length is four words, and the address direction is a positive direction.

If the bus controller 300c asserts the signals EIHREQ and EIHBURST simultaneously while the state machine 11d is in the IDLE state (C2), the state machine 11d determines that the request is a Wrap mode burst access request, and sets the operation mode to the Wrap mode. The control signal generation circuit 15d asserts the signal CSHACK in this cycle in order to notify the bus controller 300c of acknowledgement of the access request. In the case of the Wrap mode burst access request, the signals EIHREQ and EIHBURST are kept asserted until the Wrap mode burst access is completed.

The state machine 11d then transitions to the START state (C3), and the control signal generation circuit 15d responsively starts asserting the signals XCS# and XRS#. In this cycle, the address generation circuit 18c fetches an address that is output onto EIHAB[8:28], and outputs that address onto XAB[8:28]. The address generation circuit 18c also outputs "0" onto XAB[29:30], and the control signal generation circuit 15d asserts the signal XADV#. The wait counter 13 receives the number of waits that is set in the wait setting register 12. The burst counter 14 receives the burst length "3" of the signal EIHBCNT[0:2]. In this cycle, the buffer counter A 31 receives the value "0". The buffer counter B 32 receives the value on EIHAB[29:30]. The buffer counter C 33 receives the value "3".

The wait counter 13 starts down-counting as soon as the state machine 11d transitions to the WAIT state in the following cycle (C4). As many wait cycles (C4, C5) as the number of waits in the wait setting register 12 are inserted.

As soon as the state machine lid transitions to the BURST state in the following cycle (C6), the burst counter 14 starts down-counting. In this cycle, the control signal generation circuit 15d asserts the signal BAEN, whereby the buffer counter A 31 starts up-counting.

In the cycles C7 to C9, the control signal generation circuit 15d retains the values of the signals XCS# and XRS#, thereby allowing the external memory device 100 to access to successive addresses. In the case where FCOUNTA from the buffer counter A 31 matches the lower two bits EIHAB [29:30] of the access starting address during this burst access, the signal BFEN is asserted. The signal BFEN is negated when the state machine 11d transitions to the BSTART state, and asserted again when the state machine 11d transitions to the BUFFER state.

In the cycle C7, data D1 is stored in the BUFA 34. In the cycle C8, data D2 is stored in the BUFB 35. In this cycle, BCOUNT becomes "0". Moreover, the control signal generation circuit 15d asserts the signal CSHXVLD in order to notify the bus controller 300c that the data output onto XDB[0:15] is valid.

The state machine 11d transitions to the END state in the following cycle (C9). In this cycle, the signal CSHEVLD is asserted in order to notify the bus controller 300c that the data output onto EIHDB[0:15] is valid.

The state machine lid transitions to the BSTART state in the following cycle (C10). In this cycle, the control signal generation circuit 15d negates the signals XCS# and XRS#, thereby completing access to the external memory device 100. The control signal generation circuit 15d also negates the signal CSHXVLD in order to notify the bus controller 300c that the data on XDB[0:15] is no longer valid. The control signal generation circuit 15d also asserts the signal CSHBFSEL in order to notify the bus controller 300c that the data output onto CSBDB[0:15] is valid. In this cycle, the buffer selector B 39 selects the data stored in the BUFA 34 according to FCOUNTB from the buffer counter B 32, and outputs the selected data onto CSBDB[0:15].

The state machine 11d transitions to the BUFFER state in the following cycle (C11). In this cycle, the buffer selector B 39 selects the data stored in the BUFB 35 according to FCOUNTB from the buffer counter B 32, and outputs the selected data onto CSBDB[0:15].

The state machine 11d transitions to the IDLE state in the following cycle (C12). In this cycle, the control signal generation circuit 15d negates the signals CSHBFSEL and CSHBVLD in order to notify the bus controller 300c of completion of the data read operation from the buffers.

As has been described above, in the case where the lower two bits EIHAB[29:30] of the access starting address from the bus controller 300c matches the value FCOUNTA from the buffer counter A 31 while the data read from the external memory device 100 in the Non-Wrap mode is being stored in the buffer circuit 30c, the memory controller 10d of the present embodiment notifies the bus controller 300c that the data output from the external controller 100 onto XDB[0:15] without passing through the buffer circuit 30c is valid. Thereafter, the memory controller 10d outputs the data stored in the buffer circuit 30c to the bus controller 300c. This enables fast data read operation from the external memory device 100 to be achieved in addition to the effects of the memory controller 10c of the third embodiment.

Fifth Embodiment

The memory controller according to the fifth embodiment of the present invention conducts a plurality of burst access operations to the external memory device 100 when the burst length of a Wrap mode burst access request from the bus controller is longer than that supported by the external memory device 100.

Figure 24:
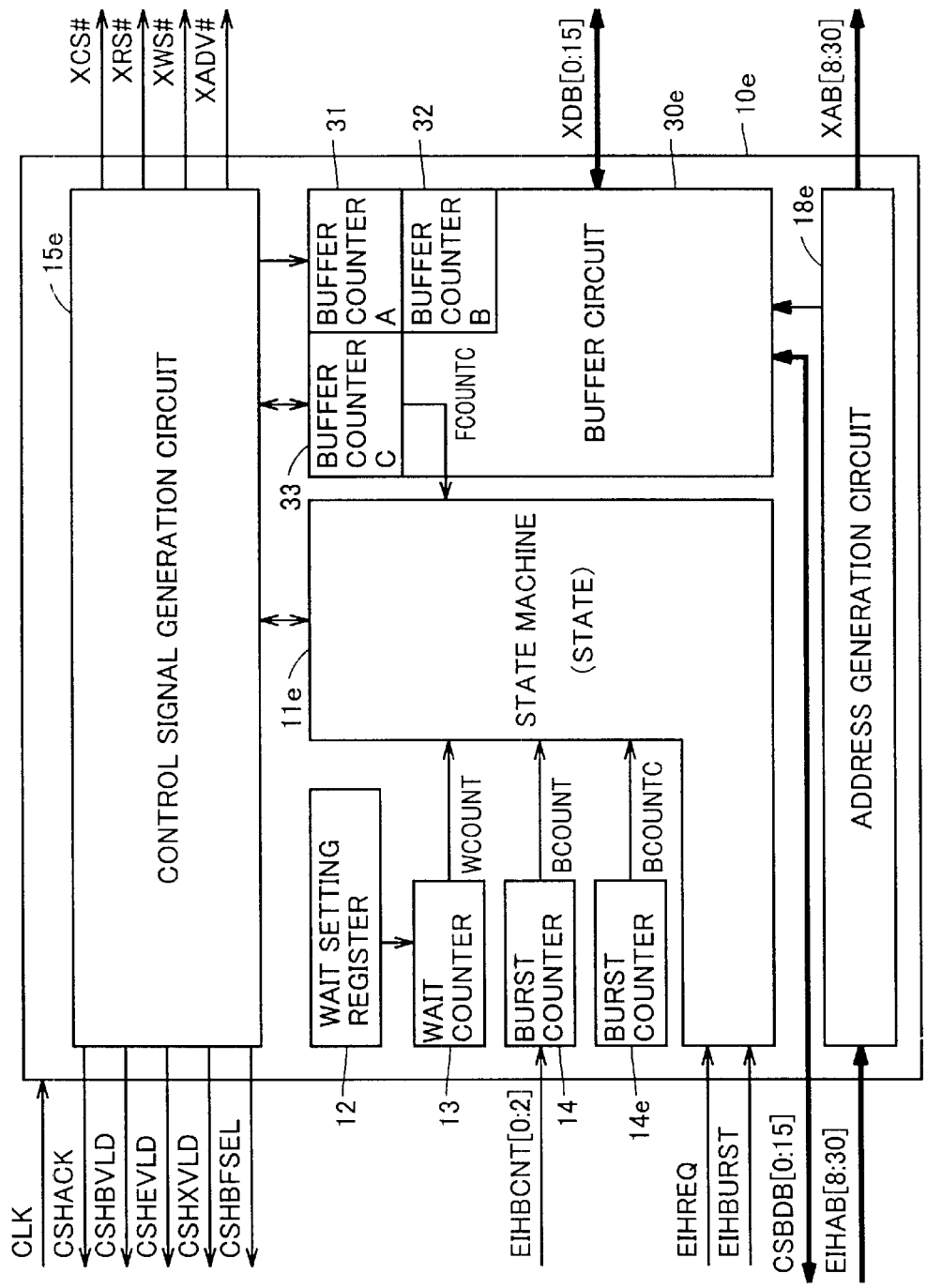
FIG. 24 is a block diagram schematically showing the structure of a memory controller 10e according to a fifth embodiment of the present invention.

FIG. 24 is a block diagram schematically showing the structure of the memory controller 10e according to the fifth embodiment of the present invention. Note that the memory controller 10e of FIG. 24 operates with the external memory device 100 of FIG. 1 and the bus controller of FIG. 2 being connected thereto. The bus controller of the present embodiment is different from that of FIG. 2 in that the following elements are added: a signal CSHBFSEL for notifying the bus controller of the state of access to a buffer described below; CSBDB[0:15] on which the data in the buffer is output; and a signal CSHBVLD for notifying the bus controller that the data output onto CSBDB[0:15] is valid. Accordingly, the bus controller of the present embodiment is denoted with "300e", and regarding the same structure and function, detailed description will not be repeated.

The memory controller 10e includes a state machine 11e for causing state transition according to the operation mode of the external memory device 100, a wait setting register 12 in which is set the number of waits in accessing to the external memory device 100 by a not-shown microprocessor or the like, a wait counter 13 for counting the number of waits that is set in the wait setting register 12, burst counters 14 and 14e for counting the number of accesses in the burst access mode, a control signal generation circuit 15e for generating a control signal for controlling the external memory device 100 and the bus controller 300e according to the state of the state machine 11e, an address generation circuit 18e for generating an address to be output to the external memory device 100, and a buffer circuit 30e for temporarily storing the data from the external memory device 100. Note that the portions having the same structure and function as those of the memory controller 10a of the first embodiment shown in FIG. 7 are denoted with the same reference numerals and characters, and detailed description thereof will not be repeated.

The burst counter 14e is a 2-bit upcounter for counting the number of accesses in burst access. The burst counter 14 manages the number of accesses for a burst access request from the bus controller 300e, whereas the burst counter 14e manages the allowable number of burst accesses to the external memory device 100.

Figure 25:
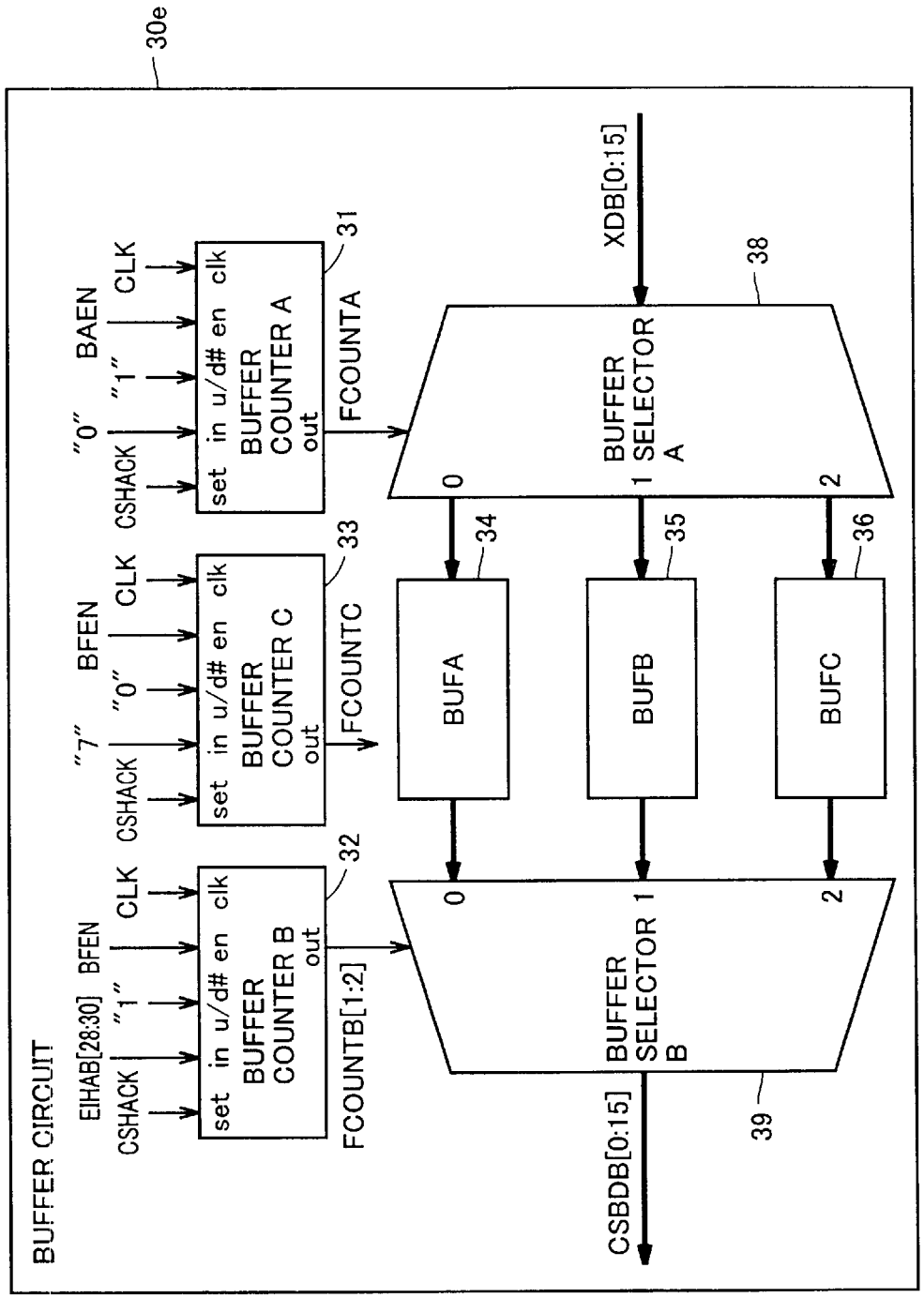
FIG. 25 is a block diagram schematically showing the structure of a buffer circuit 30e.

FIG. 25 is a block diagram schematically showing the structure of the buffer circuit 30e. The buffer circuit 30e includes BUFA 34, BUFB 35 and BUFC 36 for storing the data read from the external memory device 100, a buffer counter A 31 for controlling buffer selection for storing the data read from the external memory device 100, a buffer counter B 32 for controlling buffer selection for outputting the data stored in the buffer to the bus controller 300e, a buffer counter C 33 for counting the data output to the bus controller 300e, a buffer selector A 38 for selecting a buffer for storing the data read from the external memory device 100, and a buffer selector B 39 for selecting a buffer for outputting the data to the bus controller 300e.

The buffer counter A 31 is a 2-bit counter for receiving the value "0" in synchronization with the signal CLK when the signal CSHACK is asserted, and conducting up-counting in synchronization with the signal CLK while the signal BAEN is kept asserted.

The buffer counter B 32 is a 3-bit counter for receiving the value of EIHAB[28:30] in synchronization with the signal CLK when the signal CSHACK is asserted, and conducting up-counting in synchronization with the signal CLK while the signal BFEN is kept asserted.

The buffer counter C 33 is a 3-bit counter for receiving the value "7" in synchronization with the signal CLK when the signal CSHACK is asserted, and conducting down-counting in synchronization with the signal CLK while the signal BFEN is kept asserted.

Figure 26:
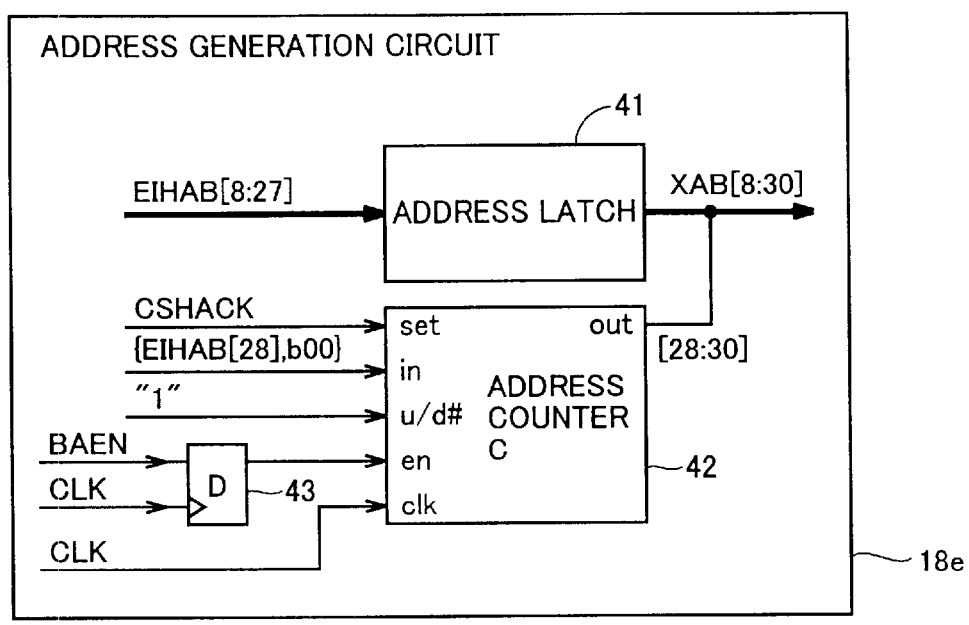
FIG. 26 is a block diagram schematically showing the structure of an address generation circuit 18e.

FIG. 26 is a block diagram schematically showing the structure of the address generation circuit 18e. The address generation circuit 18e includes an address latch 41 for latching EIHAB[8:27] output from the bus controller 300e, an address counter 42 for generating a lower-3-bit address, and a delay circuit 43 for delaying the signal BAEN by one clock.

The address counter 42 receives EIHAB[28] and 2-bit "0" {EIHAB[28], b00} in synchronization with the signal CLK when the signal CSHACK is asserted. The address counter 42 conducts up-counting in synchronization with the signal CLK while the signal BAEN delayed by one clock is kept asserted.

(1) Determination of Operation Mode

If the signal EIHBURST is not asserted at the time the signal EIHREQ is asserted, the memory controller 10e determines that the request is a single access mode request, and executes access to the external memory device 100 in the single access mode. When the signals EIHREQ and EIHBURST are both asserted simultaneously, the memory controller 10e determines that the request is a burst access mode request.

(2) Single Access Mode Operation

The state transition diagram and timing chart of the memory controller 10e in the single access mode are the same as those of the conventional memory controller 200 in the single access mode shown in FIGS. 3 and 4. Therefore, detailed description thereof will not be repeated.

(3) Burst Access Mode Operation

Figure 27:
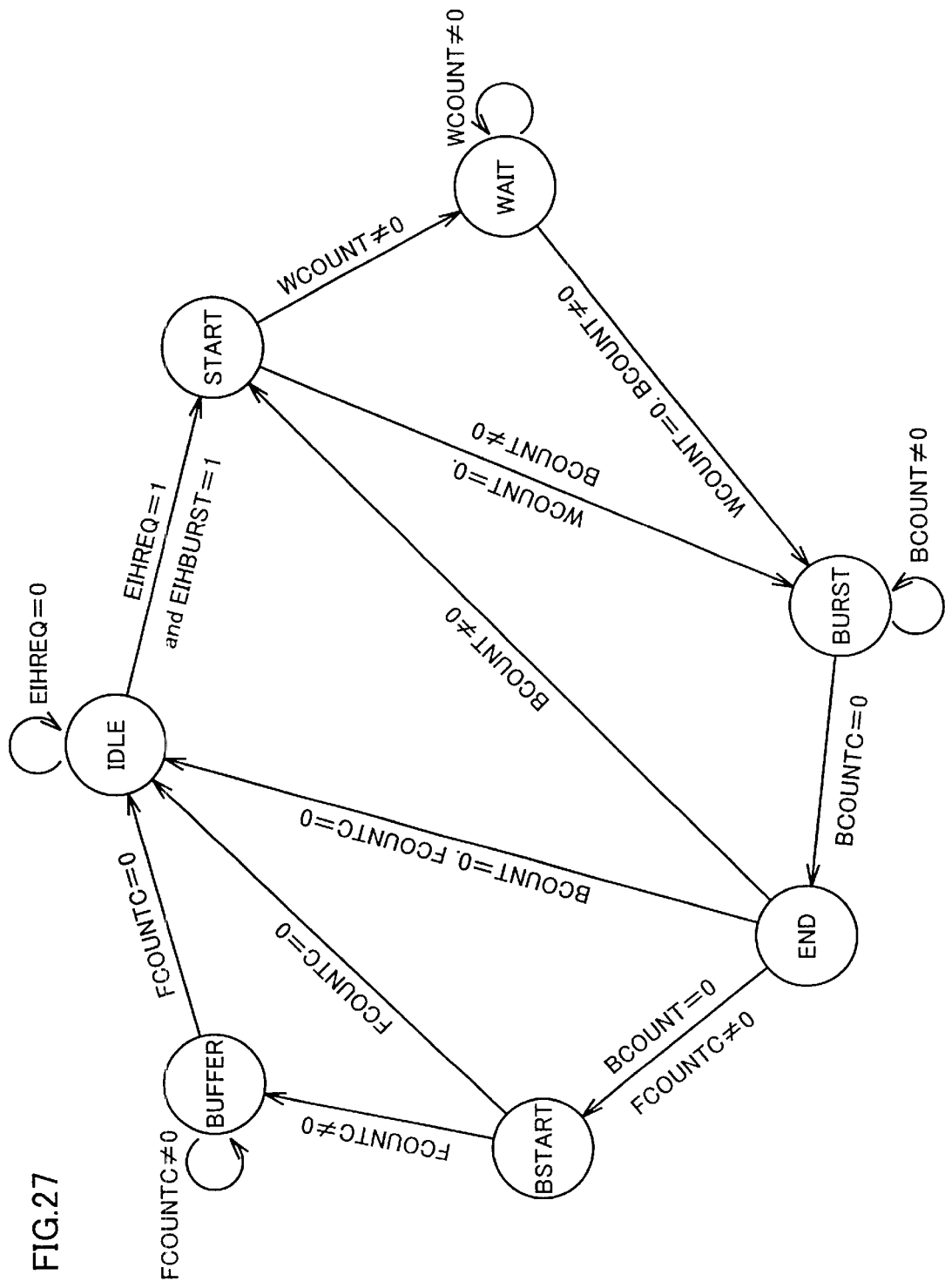
FIG. 27 is a diagram showing the state transition of the memory controller 10e in the case where a burst access request is output from a bus controller 300e.

FIG. 27 is a diagram showing the state transition of the memory controller 10e in the case where a burst access request is output from the bus controller 300e. When the signals EIHREQ and EIHBURST are both asserted in the IDLE state, the state machine 11e transitions to the START state. The START state corresponds to a cycle in which assertion of the signal XCS# is started. One cycle of the START state is always inserted for every burst access request.

If the count value WCOUNT of the wait counter 13 is not "0" (WCOUNT≠0), the state machine 11e transitions to the WAIT state in the following cycle. The WAIT state is repeated until WCOUNT becomes "0". In other words, as many access waits as the number of waits in the wait setting register 12 are inserted.

When WCOUNT is "0" and BCOUNT is not "0" (WCOUNT=0, BCOUNT≠0) in the START state, or when WCOUNT is "0" and BCOUNT is not "0" (WCOUNT=0, BCOUNT≠0) in the WAIT state, the state machine 11e transitions to the BURST state in the following cycle.

The BURST state is repeated until BCOUNT becomes "0". When BCOUNT becomes "0", the state machine 11e transitions to the END state in the following cycle. The END state is a cycle in which bus access is terminated. One cycle of the END state is always inserted at the end of the bus access. The burst access to the external memory device 100 is thus completed.

When BCOUNT is not "0" in the END state, the state machine 11e transitions back to the START state in the following cycle. When BCOUNT and FCOUNTC are "0" in the END state, the state machine 11e transitions back to the IDLE state in the following cycle. When BCOUNT is "0" and FCOUNTC is not "0" in the END state, the state machine 11e transitions to the BSTART state in the following cycle.

The BSTART state indicates a cycle in which access to the buffer is started. One cycle of the BSTART state is always inserted. When FCOUNTC is "0" in the BSTART state, the state machine 11e transitions back to the IDLE state in the following cycle. When FCOUNTC is not "0", the state machine 11e transitions to the BUFFER state in the following cycle. The BUFFER state is repeated until FCOUNTC output from the buffer counter C 33 becomes "0".

When FCOUNTC becomes "0" in the BUFFER state, the state machine 11e transitions to the IDLE state in the following cycle. The IDLE state is repeated until another access request is output from the bus controller 300e.

Figure 28:
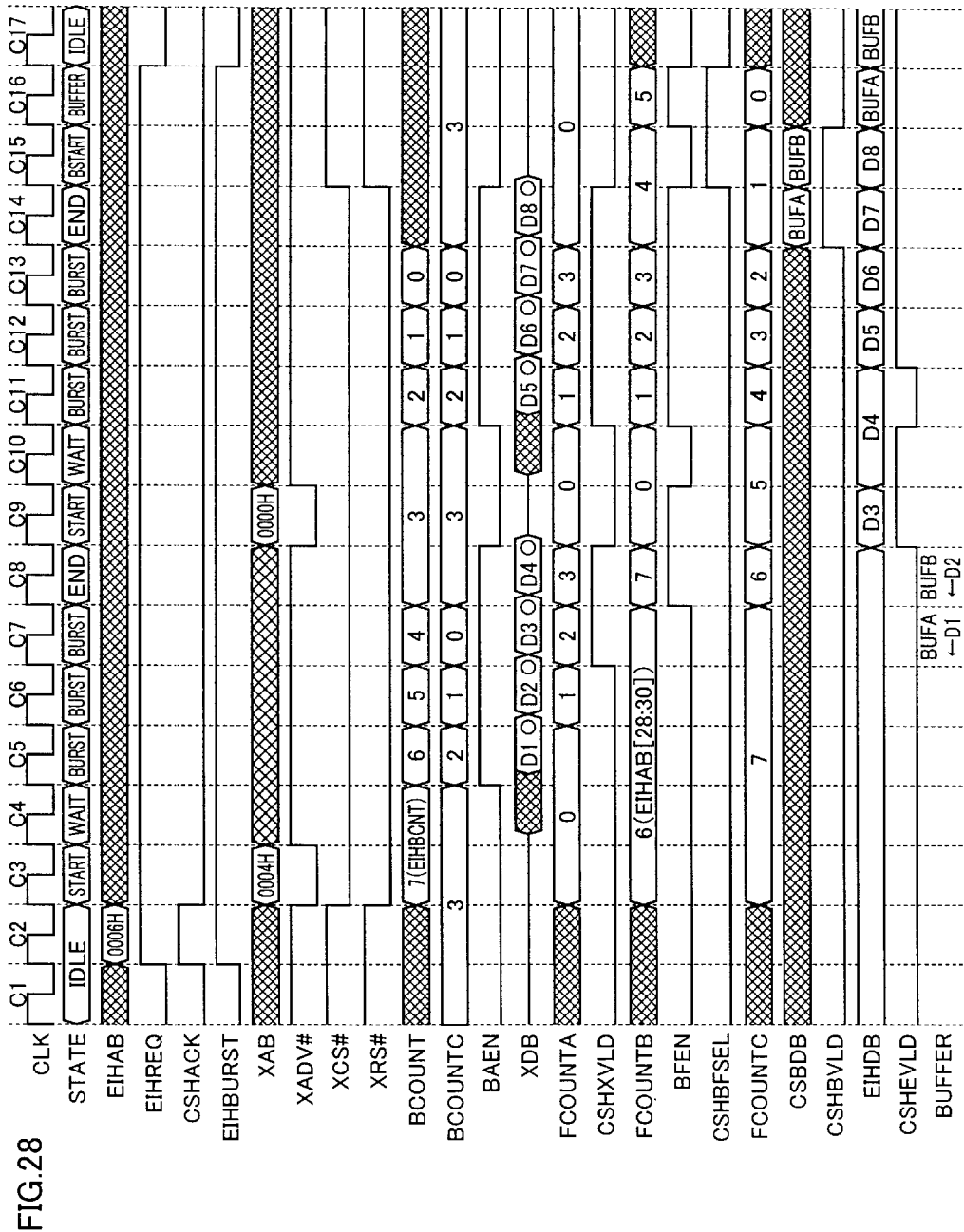
FIG. 28 is a timing chart illustrating the operation of the memory controller 10e in the case where a Wrap mode burst access request is output from the bus controller 300e.

FIG. 28 is a timing chart illustrating the operation of the memory controller 10e in the case where a Wrap mode burst access request is output from the bus controller 300e. This timing chart indicates a read operation, wherein the number of access waits is one cycle, the lower address at the start of burst access is "6", the burst length required by the bus controller 300e is eight words, and the burst length supported by the external memory device 100 is four words.

If the bus controller 300e asserts the signals EIHREQ and EIHBURST simultaneously while the state machine 11e is in the IDLE state (C2), the state machine 11e determines that the request is a Wrap mode burst access request, and sets the operation mode to the Wrap mode. The control signal generation circuit 15e asserts the signal CSHACK in this cycle in order to notify the bus controller 300e of acknowledgement of the access request. In the case of the Wrap mode burst access request, the signals EIHREQ and EIHBURST are kept asserted until the Wrap mode burst access is completed.

The state machine 11e then transitions to the START state (C3), and the control signal generation circuit 15e responsively starts asserting the signals XCS# and XRS#. In this cycle, the address generation circuit 18e receives an address that is output onto EIHAB[8:28], and outputs that address onto XAB[8:30]. Moreover, the control signal generation circuit 15e asserts the signal XADV#. The wait counter 13 receives the number of waits that is set in the wait setting register 12. The burst counter 14 receives the burst length "7" of the signal EIHBCNT[0:2]. In this cycle, the buffer counter A 31 receives the value "0". The buffer counter B 32 receives the value "6" on EIHAB[28:30]. The buffer counter C 33 receives the value "7".

The wait counter 13 starts down-counting as soon as the state machine 11e transitions to the WAIT state in the following cycle (C4). As many wait cycles (C4) as the number of waits in the wait setting register 12 are inserted.

As soon as the state machine 11e transitions to the BURST state in the following cycle (C5), the burst counters 14 and 14e start down-counting. In this cycle, the signal BAEN is asserted, whereby the buffer counter A 31 starts up-counting.

The BURST state is repeated until cycle C7. As in the memory controller 10d of the fourth embodiment, when FCOUNTA from the buffer counter A 31 does not match the lower two bits EIHAB[29:30] of the access starting address, the data output from the external memory device 100 onto XDB[0:15] is sequentially stored in the BUFA 34, BUFB 35 and BUFC 36. In the timing chart of FIG. 28, only the first two words are stored in the BUFA 34 and BUFB 35, respectively.

When FCOUNTA from the buffer counter A 31 matches the lower two bits EIHAB[29:30] of the access starting address, the signal CSHXVLD is asserted in the following cycle in order to notify the bus controller 300e that the data output onto XDB[0:15] is valid. In this cycle and the following cycles, no data is stored in the buffer circuit 30e.

The state machine 11e transitions to the END state in the following cycle (C8). In this cycle, the signal BFEN is asserted, whereby the buffer counter C 33 starts down-counting. The signal BFEN is negated when the state machine 11e transitions to the WAIT state in the cycle C10, and is asserted again when the state machine 11e transitions to the BURST state in the cycle C11.

The state machine 11e transitions to the START state in the following cycle (C9). In this cycle, the address generation circuit 18e outputs "0" onto XAB[8:30]. Moreover, the signal XADV# is asserted again, whereby the second burst access operation is started. In this cycle, the signals BAEN and CSHXVLD are negated.

In the following cycles, the same operation as that in the cycles C4 to C8 is conducted. It should be noted that, in the second burst access operation, the signal CSHXVLD is continuously asserted in order to notify the bus controller 300e that the data output onto XDB[0:15] is valid.

In the cycle C 15, the state machine 11e transitions to the BSTART state, and the signals XCS#, XRS#, BAEN and CSHBFSEL are negated, whereby burst access to the external memory device 100 is completed. The data stored in the BUFA 34 of the buffer circuit 30e is output onto CSBDB [0:15]. In this cycle, the signal CSHBVLD is asserted in order to notify the bus controller 300e that the data output onto CSBDB[0:15] is valid.

As has been described above, in the case where the burst length of the Wrap mode burst access request from the bus controller 300e is longer than that supported by the external memory device 100, the memory controller 10e of the present embodiment conducts a plurality of burst accesses to the external memory device 100. Therefore, even if the bus controller 300e outputs an access request that is not supported by the external memory device 100, the burst access operation can be conducted according to the access request.

Although the present invention has been described and illustrated in detail, it is clearly understood that the same is by way of illustration and example only and is not to be taken by way of limitation, the sprit and scope of the present invention being limited only by the terms of the appended claims.

What is claimed is:

1. A memory controller for controlling access to a burst-accessible memory according to an access request from a bus controller, comprising:

a detection circuit detecting that a burst access request from said bus controller corresponds to an access mode that is not supported by said burst accessible memory; and a control circuit accessing said burst accessible memory in an access mode different from that of the burst access request from said bus controller according to the detection result of said detection circuit, and controlling an output of data so that the data is output to said bus controller in an order corresponding to said burst access request.

2. The memory controller according to claim 1, wherein said control circuit includes a register setting an access mode that is supported by said burst accessible memory, a comparison circuit comparing the access mode that is set in said register with the burst access request from said bus controller, and a memory control circuit accessing, according to the comparison result of said burst accessible comparison circuit, to said memory in a single access mode in response to the burst access request from said bus controller, and controlling an output of data so that the data is output to said bus controller in the order corresponding to said burst access request.

3. The memory controller according to claim 2, wherein an addressing mode and a burst length that are supported by said burst accessible memory are set in said register, and said comparison circuit compares the address mode and the burst length that are set in said register with the access request output from said bus controller.

4. The memory controller according to claim 1, wherein said control circuit includes a register setting an access mode that is supported by said burst accessible memory, a comparison circuit for comparing the access mode that is set in said register with the burst access request from said bus controller, and a memory control circuit conducting, according to the comparison result of said comparison circuit, a plurality of burst accesses to said burst accessible memory in a burst access mode different from that of the burst access request from said bus controller in response to the burst access request from said bus controller, and controlling an output of data so that the data is output to said bus controller in the order corresponding to said burst access request.

5. The memory controller according to claim 1, wherein said control circuit includes a buffer circuit storing data output from said burst-accessible memory, and a memory control circuit accessing said burst accessible memory in a burst access mode different from that of the burst access request from said bus controller according to the detection result of said detection circuit so as to store in said buffer circuit the data output from said burst accessible memory, and controlling an output of data so that the data stored in said buffer circuit is output to said bus controller in the order corresponding to said burst access request.

6. The memory controller according to claim 5, wherein said detection circuit compares an addressing mode of the burst access request from said bus controller with an addressing mode that is supported by said memory.

7. The memory controller according to claim 1, wherein said control circuit includes a buffer circuit storing data output from said burst accessible memory, and a memory control circuit accessing said burst accessible memory in a burst access mode different from that of the burst access request from said bus controller according to the detection result of said detection circuit so as to store in said buffer circuit the data output from said burst accessible memory, and selectively outputting to said bus controller the data output from said burst accessible memory and the data stored in said buffer circuit so as to output the data to said bus controller in the order corresponding to said burst access request.

8. The memory controller according to claim 7, wherein said detection circuit compares an addressing mode of the burst access request from said bus controller with an addressing mode that is supported by said memory.

9. The memory controller according to claim 7, wherein said memory control circuit sequentially stores in said buffer circuit the data output from said burst accessible memory, outputs the data output from said burst accessible memory to said bus controller when a lower bit of an access starting address from said bus controller matches a lower bit of an address of the data being output from said burst accessible memory, and outputs the data stored in said buffer circuit to said bus controller after completion of access to said burst accessible memory.

10. The memory controller according to claim 9, wherein said memory control circuit conducts a plurality of burst accesses to said burst accessible memory when a burst length of the burst access request output from said bus controller is longer than that supported by said burst accessible memory.

* * * * *